United States Patent
Shen et al.

(10) Patent No.: US 11,669,657 B2
(45) Date of Patent: Jun. 6, 2023

(54) ARCHITECTURE FOR DISTRIBUTED SYSTEM SIMULATION WITH REALISTIC TIMING

(71) Applicant: Beijing Voyager Technology Co., Ltd., Beijing (CN)

(72) Inventors: Yuzhu Shen, Santa Clara, CA (US); Yun Jiang, Sunnyvale, CA (US); Alok Priyadarshi, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 345 days.

(21) Appl. No.: 17/028,814

(22) Filed: Sep. 22, 2020

(65) Prior Publication Data

US 2022/0092232 A1   Mar. 24, 2022

(51) Int. Cl.
*G06F 30/20* (2020.01)
*G06F 1/08* (2006.01)
*G06F 17/18* (2006.01)

(52) U.S. Cl.
CPC ............... *G06F 30/20* (2020.01); *G06F 1/08* (2013.01); *G06F 17/18* (2013.01)

(58) Field of Classification Search
CPC . G06F 30/20; G06F 1/08; G06F 17/18; G06F 2119/12; G06F 30/15; G06F 1/14; G06F 30/25; G06F 30/27; G06F 30/28; G06F 2111/00–2119/22
See application file for complete search history.

(56) References Cited

U.S. PATENT DOCUMENTS

| | | |
|---|---|---|
| 2016/0314224 A1 | 10/2016 | Wei et al. |
| 2017/0109458 A1 | 4/2017 | Micks et al. |
| 2018/0257683 A1 | 9/2018 | Govindappa et al. |

FOREIGN PATENT DOCUMENTS

| | | |
|---|---|---|
| JP | 11-212818 A | 8/1999 |
| WO | WO 2020/139961 A1 | 7/2020 |

OTHER PUBLICATIONS

Bumble et al. "An Architecture for a Nondeterministic Distributed Simulator" IEEE Transactions on Vehicular Technology, vol. 51, No. 3, May 2002 [retrieved on Dec. 1, 2022] (Year: 2002).*
Liu, E. "A Hybrid Queueing Model for Fast Broadband Networking Simulation" [thesis] Queen Mary, University of London [retrieved on Nov. 30, 2022] (Year: 2002).*
Wall et al. "Probabilistic Simulation-based Analysis of Complex Real-Time Systems" Proceedings of the Sixth IEEE International Symposium on Object-Oriented Real-Time Distributed Computing (ISORC'03) [retrieved on Dec. 1, 2022] (Year: 2003).*

(Continued)

*Primary Examiner* — Rehana Perveen
*Assistant Examiner* — Alfred H B Wechselberger
(74) *Attorney, Agent, or Firm* — Knobbe, Martens, Olson & Bear, LLP

(57) ABSTRACT

Systems and methods are provided for the realistic simulation of distributed systems, such as vehicle-based processing systems. A statistical property of message timestamps of a plurality of prior messages from one or more recorded processes is determined. During a simulation, messages that are generated are associated with timing data based on the statistical property from the recorded processes.

20 Claims, 12 Drawing Sheets

(56) References Cited

OTHER PUBLICATIONS

Sargent, R. "Modeling queueing systems using hierarchical control flow graph models" Mathematics and Computers in Simulation vol. 44, pp. 233-249 [retrieved on Dec. 1, 2022] (Year: 1997).*
Noshpitz, C. "Simulating Network Traffic in an Associative Processing Environment" [thesis] University of California, Santa Cruz [retrieved on Nov. 30, 2022] (Year: 1993).*
Qian, Z "High-Fidelity Simulation Model of a Dual FIFO Can Stack" [Thesis] McMaster University, Canada [retrieved on Nov. 30, 2022] (Year: 2018).*
Sokolowski et al. "Modeling and Simulation Fundamentals" [Eds] Wiley; ISBN 978-0-470-48674-0 [retrieved on Nov. 30, 2022] (Year: 2010).*
International Search Report and Written Opinion of International Application No. PCT/US2021/071469, dated Feb. 15, 2022 in 9 pages.

* cited by examiner

ARCHITECTURE FOR DISTRIBUTED SYSTEM SIMULATION WITH REALISTIC TIMING

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs) —may obtain and process sensor data using an on-board data processing system to perform a variety of functions. For example, functions can include determining and/or displaying navigational routes, identifying road signs, detecting objects and/or road obstructions, controlling vehicle operation, and/or the like.

During operation of a vehicle, the onboard processing system can process sensor data received from sensors of the vehicle. In addition, the onboard processing system can be tested without necessarily requiring operation of a vehicle or use of sensors during testing. For example, the onboard processing system can be tested by using previously-received and stored sensor data and/or sensor data that is generated specifically for use in testing particular scenarios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect includes systems, methods, and/or non-transitory computer-readable media that provide features for distributed system simulation timing alignment. The features include loading simulation data comprising: a simulated sensor message representing sensor data; a first timing data item representing an observed execution time of a subsystem, the observed execution time associated with prior processing of the sensor data and/or a message generated from prior processing of the sensor data; a second timing data item representing an observed timestamp of an output message of the subsystem, the output message associated with the prior processing of the sensor data and/or of a message generated from prior processing of the sensor data; and a consumption data item representing a message consumed by the subsystem. A time of a simulation clock is determined that corresponds to the observed execution time represented by the first timing data item. The subsystem is executed in response to determining that the time of the simulation clock corresponds to the observed execution time, wherein the simulation clock remains static during execution of the subsystem. A simulated output message of the subsystem is then generated based at least partly on the simulated sensor message, wherein a timestamp of the simulated output message comprises the observed timestamp represented by the second timing data item.

Another aspect includes systems, methods, and/or non-transitory computer-readable media that provide features for distributed system simulation with realistic timing. The features include determining a statistical property of message timestamps of a plurality of prior messages generated by a subsystem, wherein the subsystem is configured to execute recurrently, and wherein individual executions of the subsystem comprise processing output of a sensor. A time of a simulation clock is determined that corresponds to a simulated passage of a predetermined time interval after a prior execution of the subsystem. A current execution of the subsystem is initiated in response to determining that the time corresponds to the simulated passage of the predetermined time interval, wherein the simulation clock remains static during the current execution, and wherein during the current execution, the subsystem processes simulated output of the sensor. A simulated output message of the subsystem is then generated based at least partly on the simulated output of the sensor, wherein a timestamp of the simulated output message is based at least partly on the statistical property of the message timestamps.

A further aspect includes systems, methods, and/or non-transitory computer-readable media that provide features for configurable distributed system simulation timing. The features include receiving a first instruction to execute a first simulation of a distributed process in a first simulation mode of a plurality of simulation modes. The first simulation is executed in the first simulation mode. Executing the first simulation comprises: executing a first set of recurring tasks of the distributed process based on execution initiation timing data regarding a recorded instance of the distributed process; and generating one or more messages based on message generation timing data regarding the recorded instance of the distributed process. A second instruction is received to execute a second simulation of the distributed process in a second simulation mode of the plurality of simulation modes. The second simulation is executed in the second simulation mode. Executing the second simulation comprises: executing a second set of the recurring tasks based on predetermined interval data associated with individual recurring tasks of the second set; and generating a message associated a timestamp based on one or more statistical properties of message generation timing data of a plurality of recorded instances of the distributed process.

DETAILED DESCRIPTION

Figure 1A:
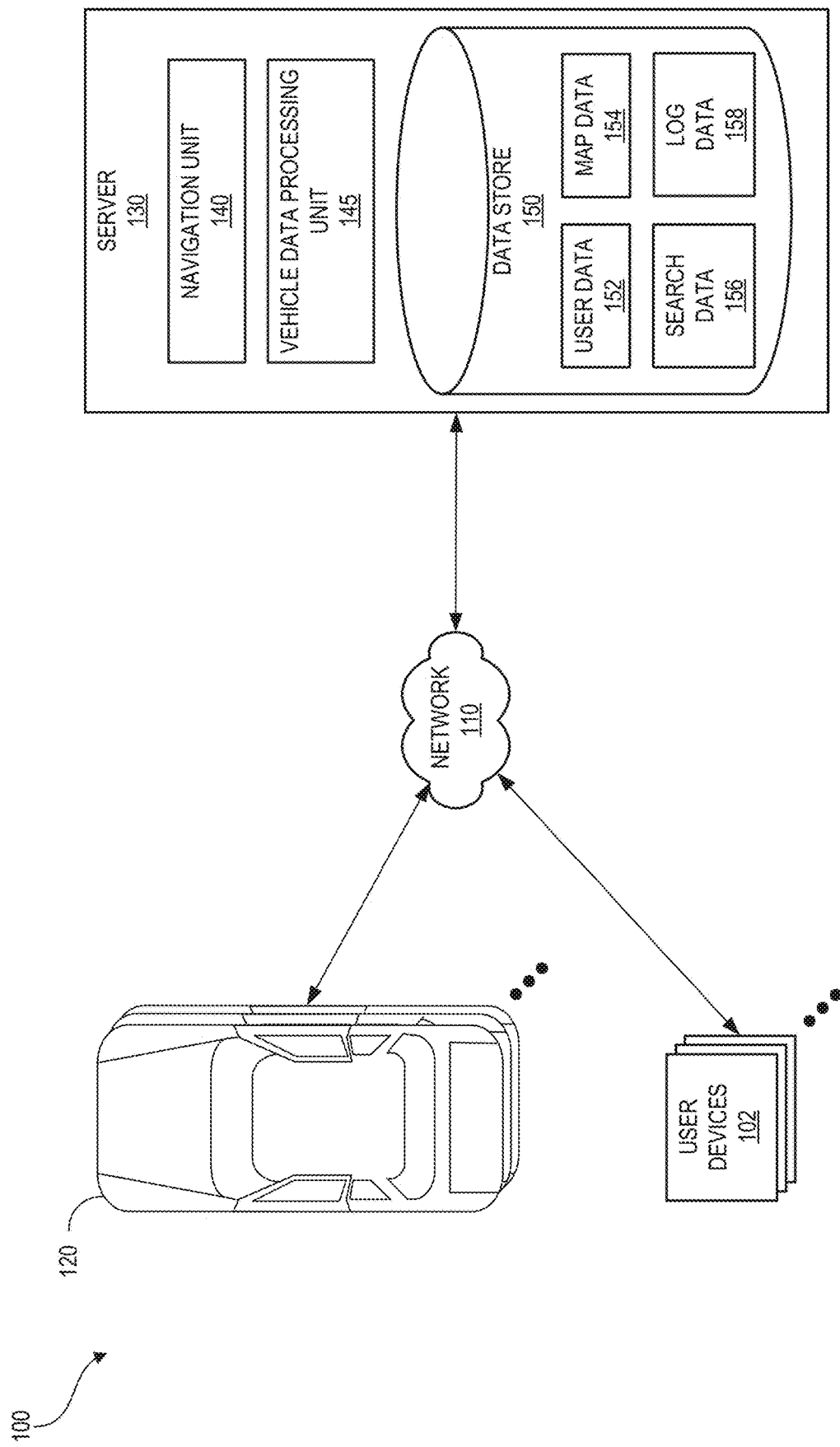
FIG. 1A illustrates a block diagram of a networked vehicle environment in which one or more vehicles and/or one or more user devices interact with a server via a network, according to certain aspects of the present disclosure.

The present disclosure is directed to simulating the operations of a distributed processing system in a realistic manner. The distributed processing system may have multiple recurrently-executing subsystems, also referred to as "nodes," that communicate using a publish-subscribe messaging protocol. Data that is input into the system (e.g., in the form of messages from one or more sensors) may be processed by some nodes according to predetermined or dynamically-determined timing intervals in relation to time kept by a system clock. The nodes publish messages to which other nodes subscribe for performing additional processing, and so on. The distributed nature of the system provides robustness (e.g., individual nodes can fail and restart without causing the entire system to fail) and efficient processing (e.g., in some implementations, a node can execute two or more threads concurrently, or two or more nodes can execute concurrently).

To simulate the operation of the distributed processing system, a simulation clock may be used during processing of simulated sensor data loaded from a data store. The simulated sensor data may be sensor data that is processed during a real-world scenario, and recorded and stored for future use in a simulation. In this way, the real-word scenario—and the operation of the distributed processing system in response to the real-world scenario—may be simulated to troubleshoot problems, test the effects of changes to the system, and the like.

During a simulation, the simulation clock may be set to a particular value and/or advanced by a predetermined or dynamically determined amount. The simulation clock may remain static during certain processing tasks, and may be advanced selectively based on certain events, such as at the completion of certain processing tasks or to initiate the scheduled execution of certain processing tasks. Nodes may execute within defined timeframes of execution (also referred to simply as "frames" for convenience) that correspond to particular times of the simulation clock. For example, a node may perform an operation in a first frame that begins at a first time to which the simulation clock is set, and then the node may stop or "sleep" while one or more nodes perform operations in one or more subsequent frames beginning at subsequent times to which the simulation clock is set. Eventually, if the first node is to perform an additional operation (e.g., another input is to be processed by the first node), the simulation clock can be set to a time corresponding to a subsequently-scheduled frame for the node. Simulated data may be processed by nodes, nodes may generate messages to be processed by other nodes, and other operations of the distributed processing system may be performed at a rate and on a schedule managed using the simulation clock.

One issue with using a simulation clock that advances only at the completion of a task (or prior to beginning a task) is that messages may appear to be published and other operations may appear to complete simultaneously with the advancement of the simulation clock. For example, operations of a node may all appear to complete as soon as execution of the node begins or simultaneously as execution of the node ends. This may not produce realistic event sequences, particularly when compared with real-world scenarios in which messages are timestamped using a continuously-advancing system clock to reflect the time at which the messages are published and/or consumed. As another example, if individual nodes are launched at slightly different times in different scenarios or simulations (e.g., due to differences in the hardware used during real-world processing and simulation, or due to different degrees of system latency or other jitter from execution-to-execution within a single architecture), the nodes may also begin publishing and consuming at different times. This may cause nodes to process messages in earlier instances of a recurring task during some executions and later instances of the recurring task during other executions, or to receive messages in different sequences from execution to execution. As a further example, jitter and communication latencies may result in different timestamps being used for messages from simulation to simulation, even when the same input data is processed by the same distributed processing system on the same hardware.

Aspects of the present disclosure address the issues discussed above, among others, by recording metadata regarding the observed timing of system operations during certain instances of processing, such as during real-world scenarios in which sensor data from "live" sensors is processed. The metadata may indicate the times, according to a continuously-progressing system clock, at which individual tasks begin and end, or the duration of time between individual executions of recurring tasks. The metadata may further indicate the times at which individual messages are generated or consumed during a task, or the offset from the beginning of execution of a task to the time of message generation or consumption. Using this metadata, simulations may be performed that exhibit more realistic timing based on the timing recorded during on-board execution.

In some embodiments, a recorded instance of the distributed processing system operating in a real-world scenario may be recreated such that at the beginning of each frame, the simulation clock is set to the same time observed at the beginning of the frame during the recorded instance. Individual messages consumed during each frame of the recorded instance are consumed during the simulation of the same frame. Individual messages generated during the course of the simulation of each frame may be assigned the same timestamp as observed for the corresponding message during the recorded instance. In this way, the execution of frames and consumption and publication of messages during the simulation are aligned with those of the scenario being simulated, providing a more realistic simulation (and potentially an exact replica) of the scenario to facilitate troubleshooting. This mode of simulation may be referred to as "aligned mode" to reflect the alignment of frame initiation times and message publication/consumption times with those of a recorded instance being simulated.

In some embodiments, a simulation may be performed based on a statistical analysis of the timing observed in recorded processes. In contrast to aligned mode discussed above, a different mode may be used to simulate the message timing that occurs during real-world scenarios due to latency, jitter, and the like. This second simulation mode may be referred to as "statistical mode." In statistical mode, a simulation may be performed such that the beginning of each frame of a recurring task occurs substantially as-scheduled (e.g., every 100 milliseconds), rather than aligning the beginning of each frame to a specific time observed in a recorded instance of the process. Timestamps for messages published and/or consumed during the frame may be based on the time at which the frame began, with the addition of an offset that is based on a statistical analysis of the time elapsed from the beginning of the frame as observed during various recorded instances of the process. The offset used for a given message and/or recurring task may be predetermined (e.g., an average, median, minimum, or maximum of times observed during recorded processes), or it may be a variable pseudo-random offset determined from a distribution of offsets observed during recorded processes (e.g., an offset selected during a simulation based on the probability of occurrence of the offset, as determined using a statistical distribution of offsets). The offset may be applied to the start time of the current frame to determine a timestamp for the message. In this way, the timestamps assigned to messages may be more realistic than using the static time of a stimulation clock. In some embodiments, the timestamps vary from simulation-to-simulation even when the same sensor input data is process during each simulation, just as is the case in real-world processing using a continuously advancing system clock.

Additional aspects of the present disclosure relate to providing a unified application programming interface ("API") through which the distributed processing system may be accessed and operated regardless of which mode of operation is being used. Illustratively, the different modes of operation may include both real-world modes and simulation modes. In some embodiments, a "production mode" may be used when operating the distributed processing system in a production environment to respond to real-world scenarios. For example, the distributed processing system may be used to implement a vehicle control system. In this example, the production model may also be referred to as "on-board mode" to reflect its implementation on board a vehicle. In some embodiments, multiple simulation modes may be available, including the alignment mode and statistical mode referenced above. In each available mode of operation, the unified API may expose the same functions and may be accessed using the same programmatic calls, thereby shielding developers from the complexity of programming nodes and other components for each separate mode of operation. A configurable flag may be set to cause the distributed processing system to operate in a particular operating mode, or an instruction to initiate operation of the distributed processing system may indicate the mode in which the system is to operate.

Detailed descriptions and examples of systems and methods according to one or more illustrative embodiments of the present disclosure may be found, at least, in the section entitled Architecture for Configurable Distributed System Simulation Timing, as well as in the section entitled Example Embodiments, and also in FIGS. 2-11 herein. Furthermore, components and functionality for configurable distributed system simulation timing may be configured and/or incorporated into the networked vehicle environment 100 described herein in FIGS. 1A-1B.

Various embodiments described herein are intimately tied to, enabled by, and would not exist except for, vehicle and/or computer technology. For example, the configurable distributed system simulation timing described herein in reference to various embodiments cannot reasonably be performed by humans alone, without the vehicle and/or computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to certain aspects of the present disclosure. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. A user device 102 can execute an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc. —based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
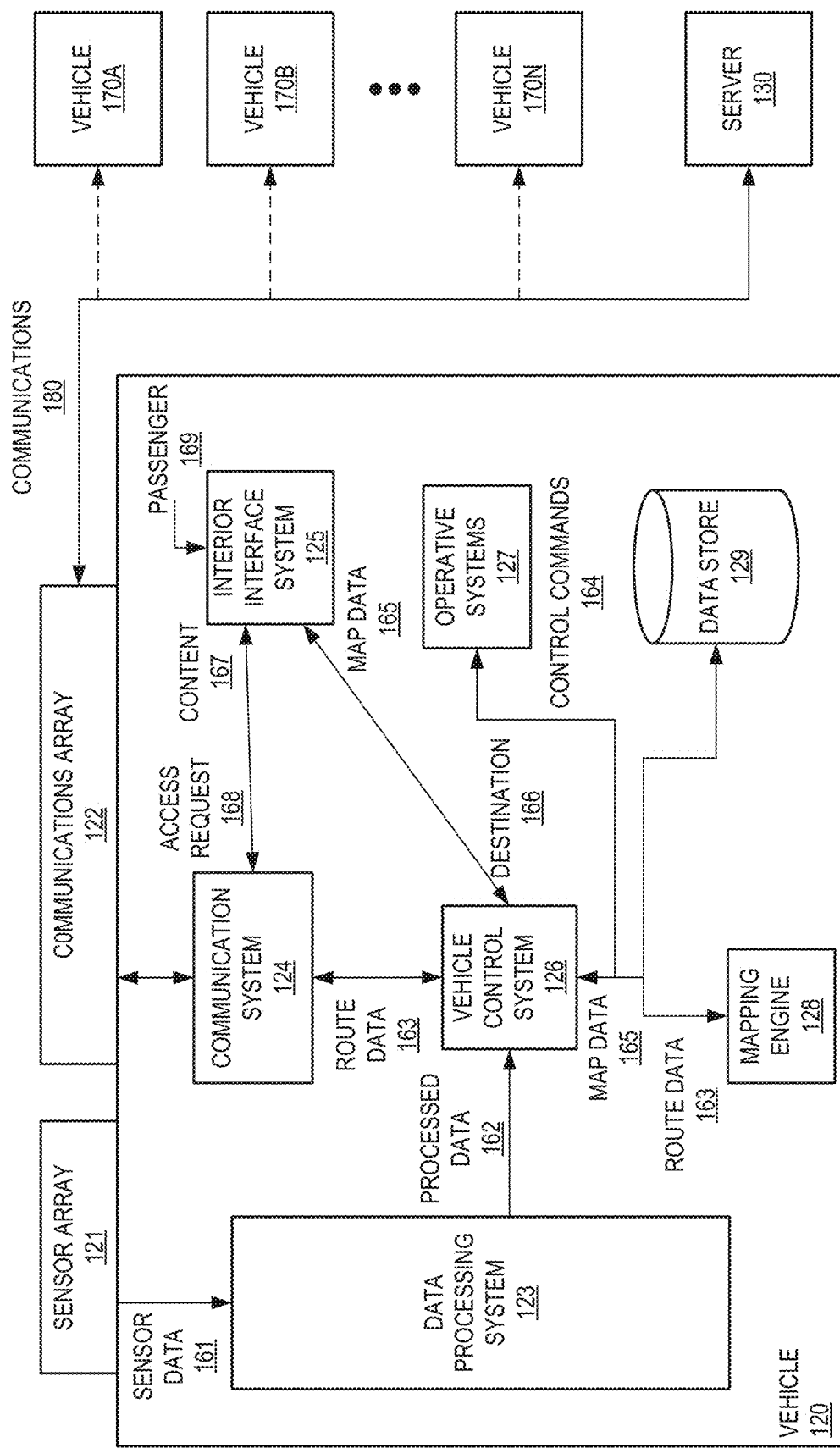
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A-N and/or the server 130 of FIG. 1A, according to certain aspects of the present disclosure. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Architecture for Configurable Distributed System Simulation Timing

Figure 2:
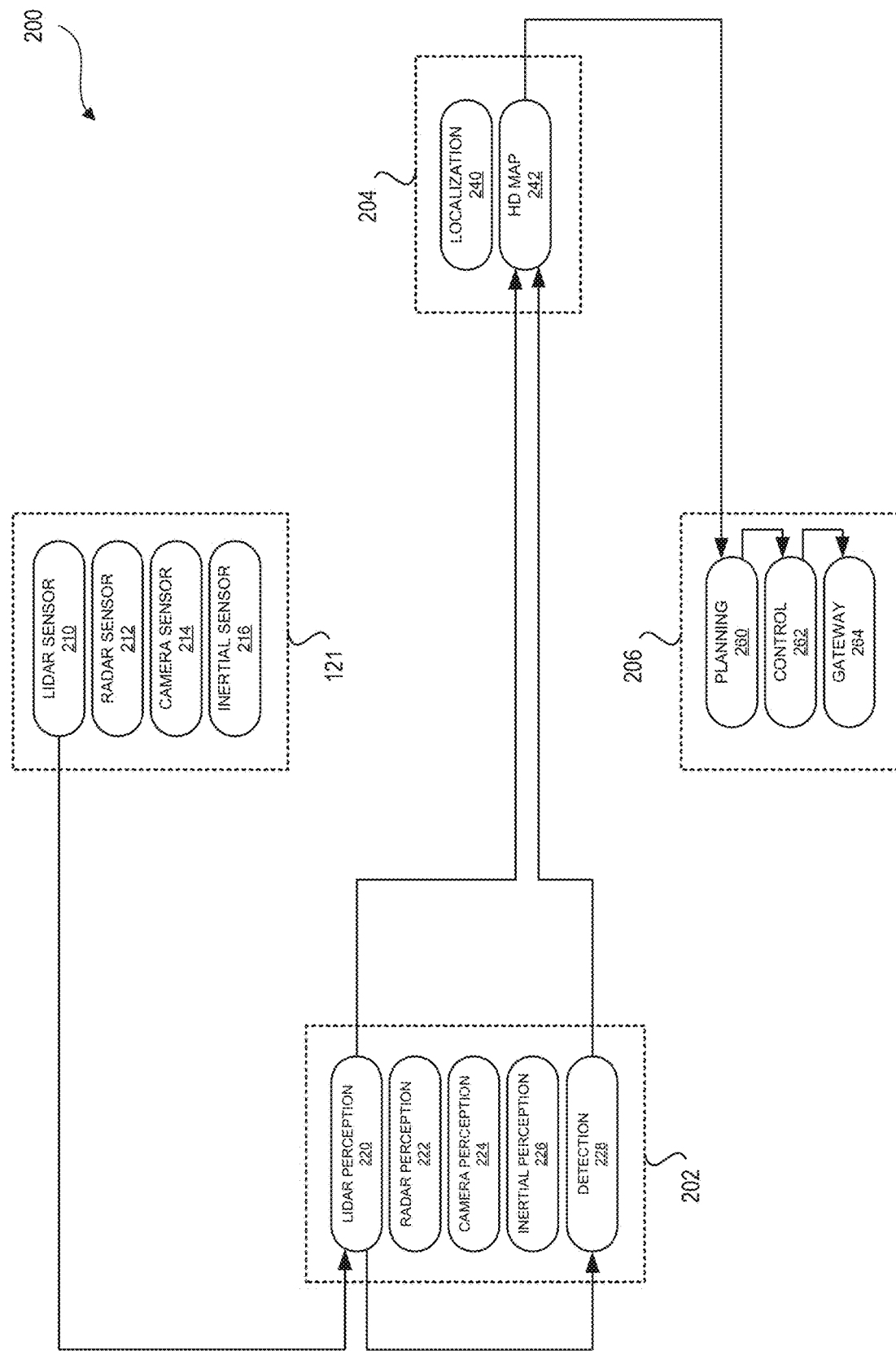
FIG. 2 illustrates a block diagram showing an on-board distributed execution and communication architecture including a computation graph for on-board processing of sensor data, according to certain aspects of the present disclosure.

FIG. 2 illustrates a block diagram of an on-board distributed execution and communication architecture. The on-board distributed execution and communication architecture includes a computation graph 200, also referred to simply as a "graph" for convenience. In some embodiments, various components and/or subsystems of a vehicle 120 may be implemented using such a computation graph 200. For example, the data processing system 123, vehicle control system 126, other components, combinations thereof, and the like may be implemented using a computation graph 200. In one specific, non-limiting embodiment, the computation graph 200 may be implemented as a Robotic Operating System ("ROS") graph.

Although the computation graph 200 is described herein with respect to specific example implementations of certain vehicle-based systems, the examples are illustrative only and are not intended to be limiting. In some embodiments, a computation graph 200 may be used to implement other vehicle-based systems, non-vehicle-based systems, combinations thereof, etc.

The computation graph 200 may receive input from the sensor array 121, which may include various sensors such as a LiDAR sensor 210, a RADAR sensor 212, a camera sensor 214, and an inertial sensor 216. The computation graph 200 may process the input from these sensors and generate output. For example, the output may represent detected obstacles, direction changes to be executed, speed adjustments to be executed, and the like.

The computation graph 200 includes several separate executable subsystems, also referred to as nodes, that preform data processing operations, communications, and/or other functions. Generally described, nodes may be programs that perform operations for a subset of a system (e.g., a portion of the vehicle 120). The system may therefore be "distributed" in that each node may run as a separate process on the computing device(s) executing the computation graph 200. In addition, the nodes may run concurrently or asynchronously. In some embodiments, nodes may be implemented as collections of smaller computational units, referred to as "nodelets." Examples of a nodelet-based architecture are described in U.S. Patent Application Publication No. 2020/0210225 A1, entitled "Architecture for Simulation of Distributed Systems," which is incorporated by reference herein.

In some embodiments, as shown, nodes may be logically grouped by function, such as perception 202, mapping 204, and planning/control 206. Within these logical groups, there may be any number of separate nodes dedicated to particular functions. For example, the perception 202 nodes may include a LiDAR perception node 220, a RADAR perception node 222, a camera perception node 224, an inertial perception node 226, and/or a detection node 228. The mapping 204 nodes may include a localization node 240 and/or an HD map node 242. The planning/control 206 nodes may include a planning node 260, a control node 262, and/or a gateway node 264.

The nodes can communicate with each other by passing messages. Messages may be routed via an inter-process communication ("IPC") system or shared intra-process memory using publish/subscribe semantics. In some embodiments, messages are published to particular message queues or "topics." Nodes can publish messages to one or more topics as long as the nodes are configured to generate messages of the particular type (e.g., data structure) for the given topic. Similarly, nodes can subscribe one or more topics as long as the nodes are configured to consume messages of the particular type for a given topic. Publishers need not be aware of which nodes are subscribing to the topic, and subscribers need not be aware of which nodes are publishing to the topic. A broker subsystem can be used to manage the distribution of messages to the nodes subscribing to particular topics.

In an illustrative example, the LiDAR perception node 220 may receive an input message from the LiDAR sensor 210. The LiDAR perception node 220 may perform processing on the input message, and generate an output message (e.g., an analysis of data from the LiDAR sensor 210). The LiDAR perception node 220 can publish the output message on a LiDAR perception topic. Any number of other nodes of the graph 200 may subscribe to messages on the LiDAR perception topic. For example, the HD map node 242 and planning node 260 may both subscribe to messages of the LiDAR perception topic. When the LiDAR perception node 220 publishes the message on the LiDAR perception topic, the broker can determine that the HD map node 242 and planning node 260 are subscribers to the topic and provide the message to the subscriber nodes.

The graph 200 does not necessarily need to receive input directly from live sensors in the sensor array 121. Rather, as long as the input data is structured correctly (e.g., provided using the data structure and data types expected by subscribing nodes), the graph 200 can process the input. This feature of the graph 200 can be leveraged to run simulations. For example, a developer may wish to debug a particular condition that occurred during use, or test the effect that certain changes to the graph 200 will have on the output from the graph 200. By running simulations using the same input, the developer can observe the step-by-step processing performed by the graph 200 and the effect that individual changes to the graph 200 have on the processing performed by, and output from, the graph 200.

In some embodiments, the input for a simulation may be serialized data from the sensor array 121. For example, the sensor array 121 may be used to generate sensor data regarding real-world observations, such as those occurring during use of the vehicle 120 in real-world scenarios. The sensor data may be serialized or otherwise processed into a format that can be stored persistently. Then, the stored data can be input into the graph 200 during one or more simulations to troubleshoot issues, test structural and/or functional changes to the graph 200, etc.

Figure 3:
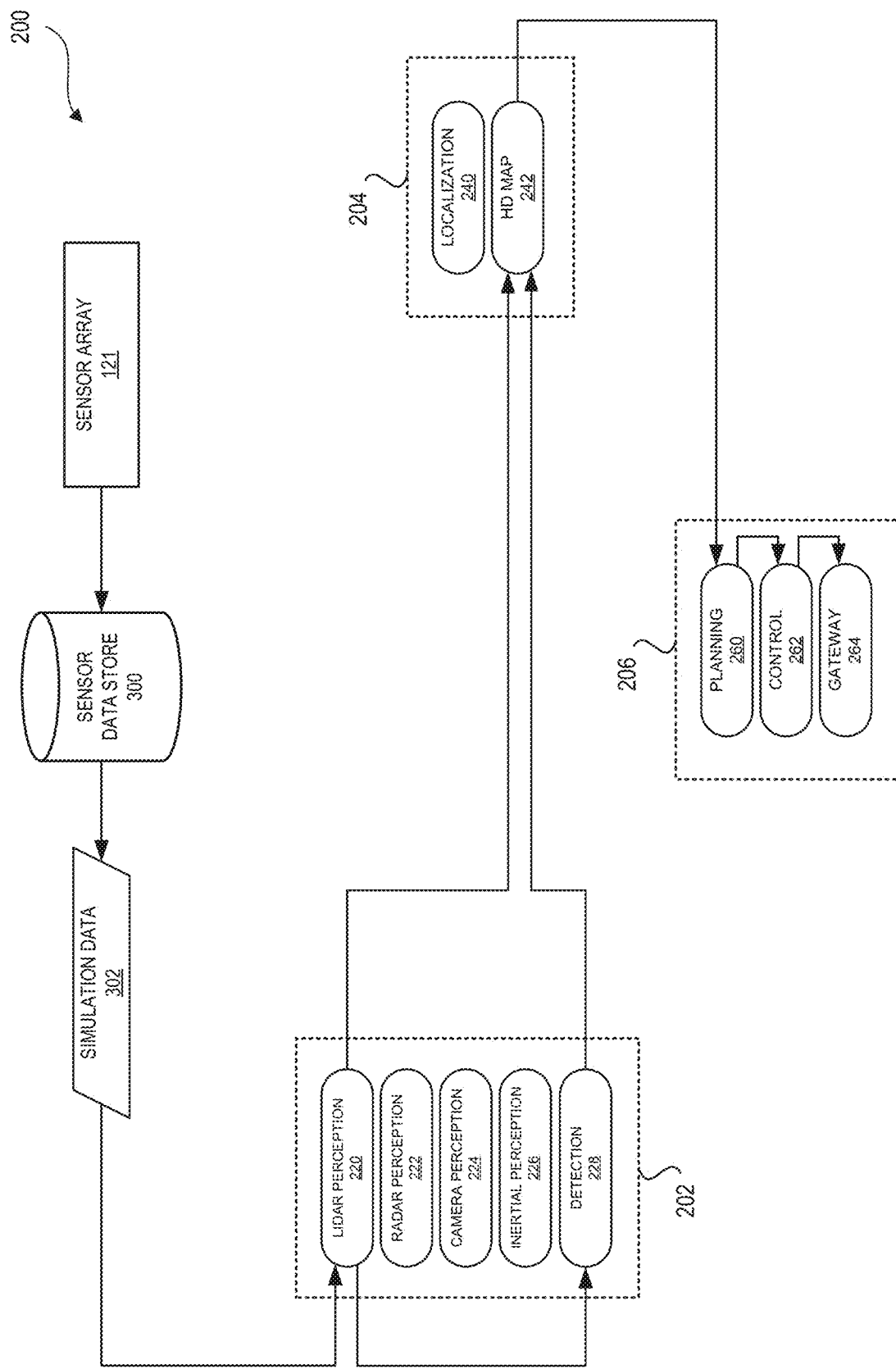
FIG. 3 illustrates a block diagram showing a simulated distributed execution and communication architecture including a computation graph for simulated processing of sensor data, according to certain aspects of the present disclosure.

FIG. 3 illustrates a block diagram of the computation graph 200 of FIG. 2 accepting stored input data rather than data directly from the sensor array 121. As shown, output from the sensor array 121 may be serialized or otherwise processed into a format that allows persistent storage in a data store 300. When a simulation is to be run, the serialized simulation data 302 may be loaded from the data store 300 and processed by the graph 200. Output data from the graph 200 may also be serialized or otherwise processed into a form that can be stored persistently. Thus, output data from multiple different simulations can be analyzed to determine the effect that certain changes to the graph 200 have on the output generated from the same input data 302, the effect that changes to the input data 302 have on the output from the same graph 200, etc.

Figure 11:
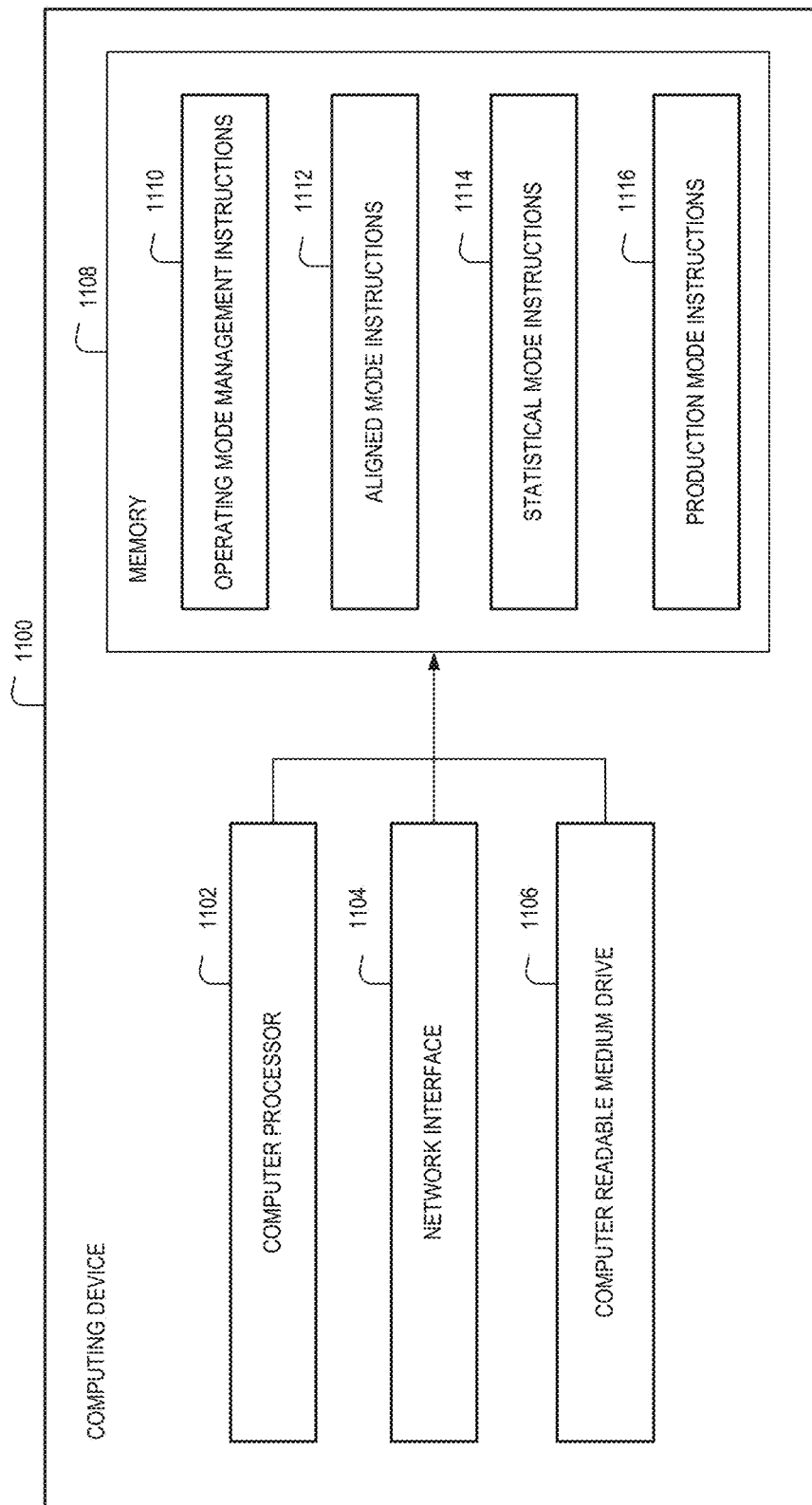
FIG. 11 illustrates a block diagram of a computing system configured to implement aspects of the present disclosure.

In some embodiments, the hardware on which the computation graph 200 is implemented for simulations may be the same as, or different than, the hardware on which the computation graph 200 is implemented for on-board processing. For example, a simulation may be run using the vehicle 120, with simulation data 302 from a data store 300 replacing live sensor data from the sensor array 121. As another example, a simulation may be run using computing devices separate from a vehicle 120, such as one or more server computing devices. An example computing device on which simulations (or aspects thereof) may be implemented is shown in FIG. 11 and described below.

A given node of a graph 200 may be implemented to perform a recurring task The recurring task may be a conceptual unit of work that is performed repeatedly according to a schedule, such as every x units of time (where x is a positive number, and where the units of time may be defined as multiples or fractions of a base unit, such as seconds, milliseconds, nanoseconds, etc.). For example, the planning node 260 may execute every 100 milliseconds. In some cases, a node may also or alternatively be triggered by an event, such as the arrival of a message.

Each execution of a recurring task occurs within a single timeframe, referred to as a "frame of execution" or simply as a "frame." During a frame, a node may consume one or more messages as input, and publish one or more messages as output. Each message may be associated with a timestamp indicating the time at which the message was generated or published. In some embodiments, multiple nodes may execute during the same frame, may consume the same messages or different messages, may publish messages to the same topic or to different topics, etc. In subsequent frames, the same node or a different node (or nodes) may consume the same messages as the prior node(s), messages published by the prior node(s), and/or different messages altogether. In some embodiments, frame pipelining may be permitted such that a subsequent frame of execution for a particular recurring task may begin before a prior frame of execution for the same task has ended.

During on-board processing of data from the sensor array 121 during real-world scenarios (e.g., as shown in FIG. 2), a system clock of the vehicle 120 may be used to schedule or otherwise determine when frames are to begin, and to determine timestamps for messages. For example, an orchestrator component may maintain or otherwise access a system clock to determine when frames are to begin. As another example, a messaging middleware component or the nodes of graph 200 themselves may access a system clock to generate timestamps indicating when messages are published and/or consumed. The system clock may advance continuously during operation of the graph 200 and vehicle 120 to facilitate execution of the graph 200.

The distributed nature of the graph 200 provides robustness and efficient processing. However, the distributed nature of the graph 200 may also be non-deterministic, resulting in output and/or a sequence of operations that may differ from execution to execution, even when identical input data is used. Such differences from execution to execution may be observed regardless of whether the executions being compared are each real-world scenarios, simulations, or a combination thereof. For example, if individual nodes are launched at slightly different times in different scenarios or simulations (e.g., due to differences in the hardware between vehicle 120 and the simulation architecture, or due to different degrees of system latency or other jitter from execution-to-execution within a single architecture), the nodes may also begin publishing and subscribing to topics at different times. This may cause nodes to process messages in earlier frames during some executions and later frames during other executions, receive messages in different sequences from execution to execution, etc. As another example, different hardware may execute nodes at different speeds, which may also lead to the previously-discussed issues, among others. As a further example, jitter and communication latencies may result in different timestamps being used for timestamped output data from simulation to simulation, even when the same input data 302 is processed by the same graph 200 on the same hardware.

To address some of these issues, a simulation clock may be used during simulated processing of sensor data from a data store 300 (e.g., as shown in FIG. 3) instead of a continuously-advancing system clock to determine when individual frames are to begin, and to provide a basis for generating timestamped messages during a frame. Such as simulation clock may be set to a particular value and/or advanced by a predetermined or dynamically determined amount by a task scheduler or some other component of the simulation architecture. When the simulation clock value is updated to the next predetermined or dynamically determined value, the orchestrator may initiate a frame of execution for any recurring tasks triggered by the updated simulation clock value. In addition, the time indicated by the simulation clock may not change until the orchestrator increments or otherwise sets the simulation clock to another time. Thus, the time given by the simulation clock does not progress continuously during the course of execution, but rather jumps from value to value as new frames begin. Timestamped data that is generated at any point during a given frame according to the simulation clock (e.g., the time reflected by the simulation clock at the beginning of the current frame) may therefore be timestamped with the same value, regardless of when within the frame the timestamped data is generated. Accordingly, jitter and the latencies that change from simulation to simulation—and which would normally impact the amount of time elapsed between events and otherwise affect timestamped data—do not impact simulations that use the simulation clock.

One issue with using a simulation clock in this manner is that when the simulation clock advances only at the completion of a frame (or prior to beginning a frame), messages may appear to be published and other operations may appear to complete simultaneously with the advancement of the simulation clock. For example, operations of a frame may all appear to complete as soon as frame begins or simultaneously as the frame ends. This may not produce realistic event sequences, particularly when compared with real-world scenarios for which the simulation is being run to troubleshoot issues.

Figure 4:
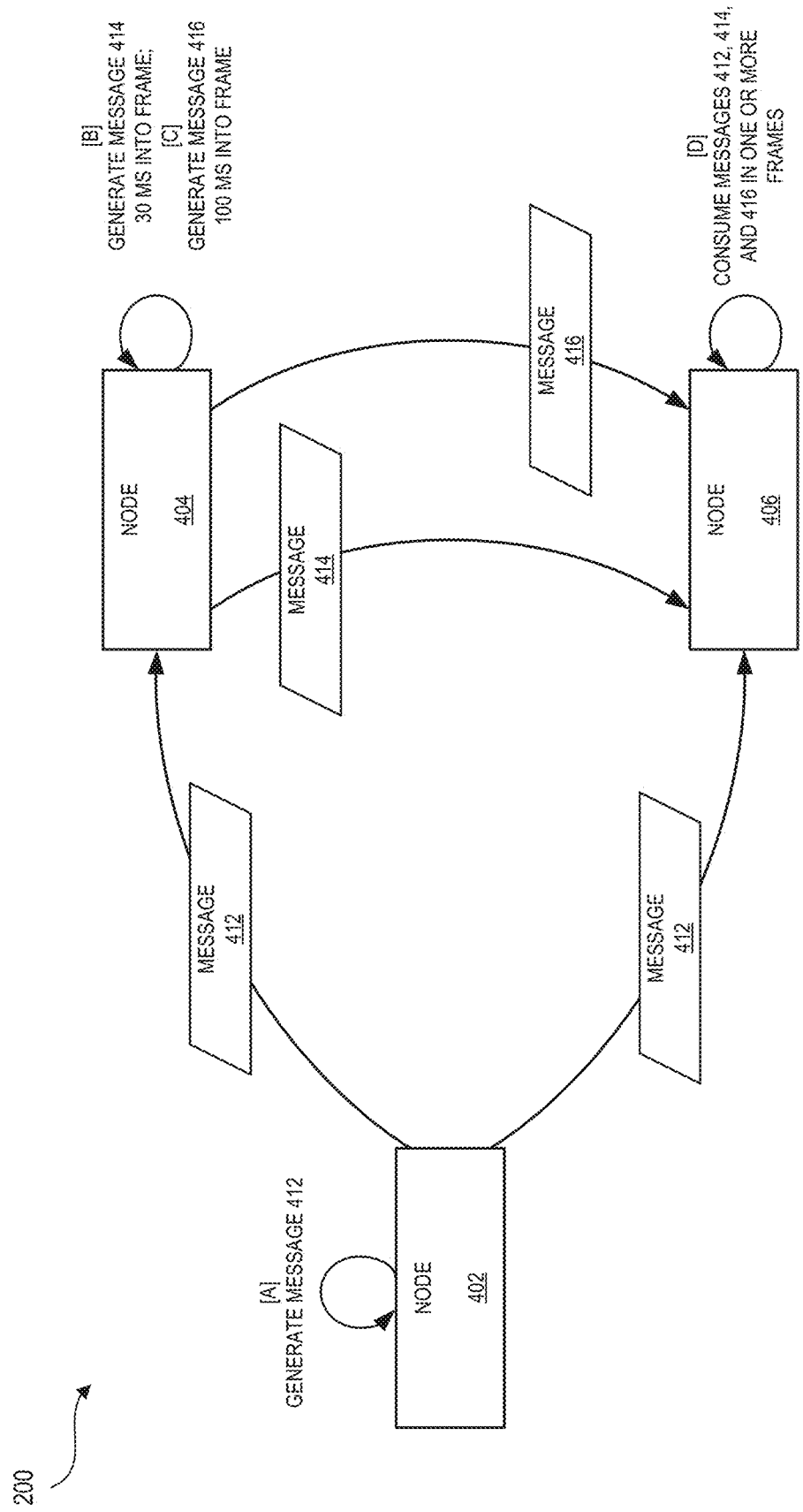
FIG. 4 illustrates a block diagram of multiple nodes generating, sending, and consuming messages, according to certain aspects of the present disclosure.

FIG. 4 shows an embodiment of a computation graph 200 in which an example set of messages is published and consumed, illustrating the issues noted above. Node 402 publishes message 412 during a frame. Nodes 404 and 406 subscribe to messages in this topic, and may consume the message during subsequent frames of execution. A frame for node 404 may then occur during which node 404 may consume message 412. Processing of message 412 may cause node 404 to publish messages 414 and 416. Publication of message 414 may occur 30 milliseconds after the beginning of the frame in which node 404 is executing, and publication of message 416 may occur 100 milliseconds after the beginning of the same frame. When this sequence of frames and message publication and consumption events occurs during a real-world scenario in an on-board architecture (e.g., in the vehicle 120), the messages 412, 414, and 416 may be consumed by node 406 at different times, potentially during two or three different frames. In a simulation using a simulation clock as described above, however, messages 414 and 416 (and potentially message 412) may all be consumed by node 406 during the same frame of execution. Moreover, messages 414 and 416 may have the same timestamp and may therefore be handled in a different order than would otherwise be the case.

To address the issues discussed above, among others, various features may be implemented to facilitate realistic execution of simulations. In some embodiments, metadata is generated regarding graph execution during on-board processing of sensor data in real-world scenarios. The metadata may indicate the times, according to a continuously-progressing system clock, at which individual frames begin and end, or the duration of time between individual frames of a particular recurring task. The metadata may further indicate the times at which individual messages are generated during a frame, or the offset from the beginning of the frames to the time of message publication. The metadata may further indicate which messages are consumed during a frame. Using this metadata, simulations may be performed that exhibit more realistic timing based on the timing recorded during on-board execution.

In some embodiments, a particular scenario may be recreated such that at the beginning of each frame, the simulation clock is set to the same time observed at the beginning of the frame during on-board execution. Individual messages generated during the course of the frame may be assigned the same timestamp as observed for the corresponding message during on-board execution. In this way, the execution of frames and publication of messages during the simulation are aligned with those of the real-world scenario being simulated, providing a more realistic simulation (if not an exact replica) of the real-world scenario and facilitating troubleshooting. This mode of simulation may be referred to as "aligned mode" to reflect the alignment of frame initiation times, message publication times, and identifiers of messages consumed with those of a real-world scenario or other recorded process being simulated.

In some embodiments, a particular scenario may be recreated such that the beginning of each frame of a recurring task occurs substantially as-scheduled (e.g., every 100 milliseconds). Timestamps for messages published and/or consumed during the frame may be based on the time at which the frame began, with the addition of an offset that is based on a statistical analysis of the time elapsed from the beginning of the frame as observed during on-board processing of real-world scenarios. The offset used for a given message and/or recurring task may be predetermined (e.g., an average, median, minimum, or maximum of times observed during recorded processes), or it may be a variable pseudo-random offset determined from a distribution of offsets observed during recorded processes (e.g., an offset selected during a simulation from a normal distribution defined using a mean and standard deviation). The offset may be applied to the start time of the current frame to determine a timestamp for the message. This mode of simulation may be referred to as "statistical mode" or "variable mode" to reflect the variable or otherwise statistically-determined message publication/consumption times based on those observed in any number of real-world scenarios or other recorded process.

Figure 5:
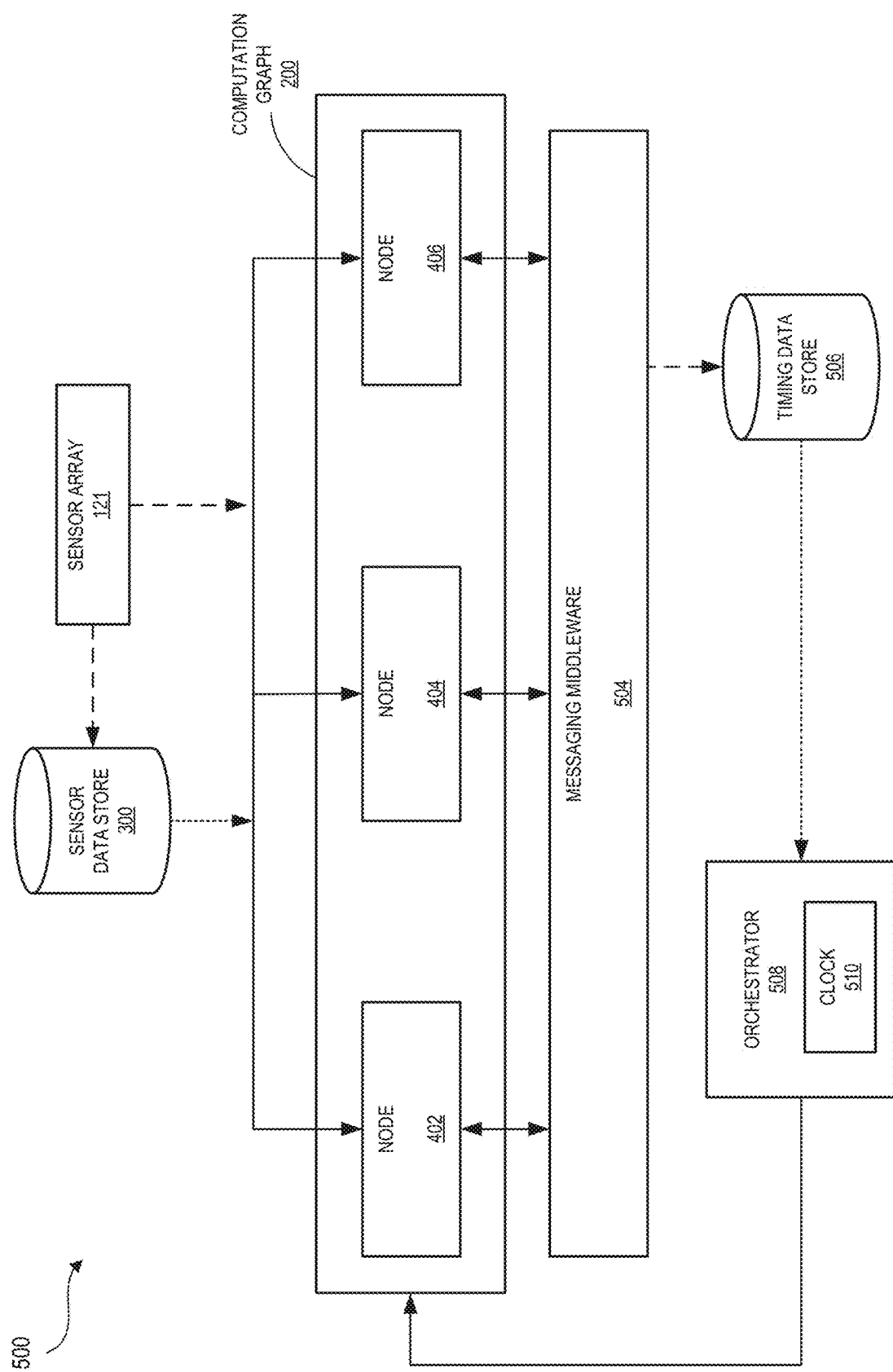
FIG. 5 illustrates a block diagram of a distributed processing system configured to generate and record during on-board processing, and use the metadata during simulation processing, according to certain aspects of the present disclosure.

FIG. 5 illustrates an embodiment of a distributed processing system 500 in which a computation graph 200 may be executed in a plurality of operating modes, including a production mode and one or more simulation modes. The production mode may be used to process sensor data in a real-world scenario. Thus, the production mode may be used when executing the computation graph 200 in an on-board architecture, such as when a vehicle control system or other on-board system of a vehicle 120 is implemented using the distributed processing system 500. The simulation modes may include one or both of the aligned mode and statistical mode. These simulation modes may be used when executing the computation graph 200 outside of a vehicle 120, such as on one or more computing systems like the one shown in FIG. 11 and/or on the server 130. Advantageously, the functionality of the distributed processing system 500 may be accessed and configured via a unified application programming interface ("API") such that the functions of the distributed processing system 500 are able to be accessed in the same or substantially the same manner, regardless of which operating mode is active. In addition, processes performed in production mode may be recorded, and the recorded data regarding the processes may be used in a simulation mode to accurately re-create a process (e.g., an individual recorded trip of a vehicle 120) and/or to realistically simulate the operation of the distributed processing system 500 in real-world conditions (e.g., based on multiple recorded trips of one or more vehicles 120).

The distributed processing system 500 includes messaging middleware 504 to manage message publication and subscription by the nodes 402, 404, and 406 of the computation graph 200. An orchestrator 508 with a clock 510 manages the initiation of frames of execution during processing. Input to the computation graph 200 may be sensor data from the sensor array 121 during production mode, or simulated sensor data from a sensor data store 300 during one or more of the simulation modes.

In some embodiments, the interactions indicated with solid-lined arrows may occur in any operating mode, the interactions indicated with dashed-lined arrows may occur only in production mode, and the interactions indicated with dotted-lined arrows may occur only in a simulation mode. Although only three nodes 402, 404, and 406 are shown, the illustration is for example only and is not meant to be limiting. In some embodiments, the graph 200 may include any number of nodes.

In production mode, input data to be processed by the computation graph 200 may be in the form of messages from the sensor array 121 (or individual sensors thereof). In some embodiments, the sensor array 121 (or individual sensors thereof) may generate sensor data messages on a predetermined schedule (e.g., every 10, 50, or 100 milliseconds). To facilitate later simulated processing based on real-world sensor data, the sensor data messages may be recorded in the sensor data store 300.

Processing of the input data may be performed using one or more recurrently-executing nodes of the computation graph 200. In some embodiments, recurring executions of individual nodes of the computation graph 200 may occur according to predetermined execution intervals. For example, node 402 may be scheduled to execute every 50 milliseconds, while nodes 404 and 406 may be scheduled to execute every 100 milliseconds. The orchestrator 508 may manage initiating frames of execution for the nodes based on the clock 510, which in production mode may be a continuously-advancing system clock. To facilitate later simulated processing based on real-world execution timing, timing data regarding the frames of execution may be recorded and stored in a timing data store 506, as described in greater detail below.

During the frames of execution, the nodes of the computation graph 200 may generate one or more messages. The messaging middleware component 504 may manage the publishing of messages, and provide published messages to any nodes that subscribed to the messages during the next frames of execution of the subscriber nodes. For example, a callback to a subscriber node may be executed in order to initiate processing by the subscriber node of a published message. To facilitate later simulated processing based on real-world message timing, timing data regarding the messages may be recorded and stored in the timing data store 506.

In one specific non-limiting embodiment, a frame data structure is used to record execution timing data regarding a frame of execution, message timing data regarding timestamps associated with messages published during the frame, and/or message consumption data regarding identifiers (e.g., publication timestamps) associated with messages consumed (subscribed) during the frame. For example, a frame data structure may be maintained by the orchestrator 508 and/or node executing in a particular frame. If multiple nodes execute in a particular frame, the frame data structure may be passed to all such nodes.

Table 1, below, shows an example of a frame data structure to record various data items about a particular frame, such as the identity of the recurring task for which the frame was executed (e.g., the "task_name" element) and timing data regarding events associated with the frame. As shown, the timing data may include a data item representing the time of the clock 510 when the frame began (e.g., the "start_timestamp" element). The frame data structure may also include set of data items regarding the messages published during the frame, and times at which each such message was published (e.g., the "publishers" section). This set of data items may identify the publisher of each message (e.g., the "pub_name" identifier), which may correspond to a particular node of the computation graph 200 or a particular topic name. Following the publisher identifier, a set of one or more timestamps may be recorded for each message published by the node or to the topic represented by the publisher identifier. The timestamps may be determined using the clock 510. By using a sufficiently specific timestamp (e.g., a timestamp to the nanosecond), each message published during a frame may be uniquely identified (or substantially uniquely identified such that collisions are avoided for most practical purposes), particularly when the timestamps are combined with the publisher identifier to identify an individual message. The frame data structure may further include a set of data items (e.g., in the "subscribers" section) that identify the messages consumed during the frame and the times at which each such message was previously published during a prior frame and/or consumed during the current frame. This set of data items may identify the subscriber that has consumed each message (e.g., the sub_name" identifier), which may correspond to a particular node of the computation graph 200 or a particular topic name. Following the subscriber identifier, a set of one or more timestamps (publication times and/or consumption times) may be recorded for each message consumed by the node or from the topic represented by the subscriber identifier. The timestamps may be determined using the clock 510. For example, the timestamps may represent the publication times of the consumed messages, and the timestamps may therefore be used as identifiers from which the specific previously-published messages can be uniquely identified. By using a sufficiently specific timestamp (e.g., a timestamp to the nanosecond), each message consumed during a frame may be uniquely identified or substantially uniquely identified, particularly when the timestamps are combined with the subscriber identifier to identify an individual message.

TABLE 1 task_name # The unique name of recurring task.
start_timestamp # The start time of the frame.
publishers # Records publication times for all outgoing messages of this
    # frame. Each publisher has a unique name within the scope of
    # the recurring task. May be set to the message topic name.
  { pub_name 1 : [ pub_time 11 , pub_time 12 , ... ],
    pub_name 2 : [ pub_time 21 , pub_time 22 , ... ],
    ...
  }

TABLE 1-continued

```
subscribers  # Records identifiers (e.g., publication times) for all
            # messages consumed during this frame. Each
            # subscriber has a unique name within the scope of the
            # recurring task. May be set to the message topic name.
  { sub_name 1 : [ pub_time 11 , pub_time 12 , ... ],
    sub_name 2 : [ pub_time 21 , pub_time 22 , ... ],
    ...
  }
}
```

When the distributed processing system 500 is used to implement a vehicle control system in an on-board architecture operating in production mode, the data recorded and stored in the timing data store 506 may be referred to as trip data. Such trip data may be used to simulate a particular trip of a vehicle 120 (e.g., by performing a simulation in aligned mode), or may be combined with trip data regarding multiple trips to simulate the general operation of the distributed processing system 500 in real-world conditions (e.g., by performing a simulation in statistical mode).

Figure 6:
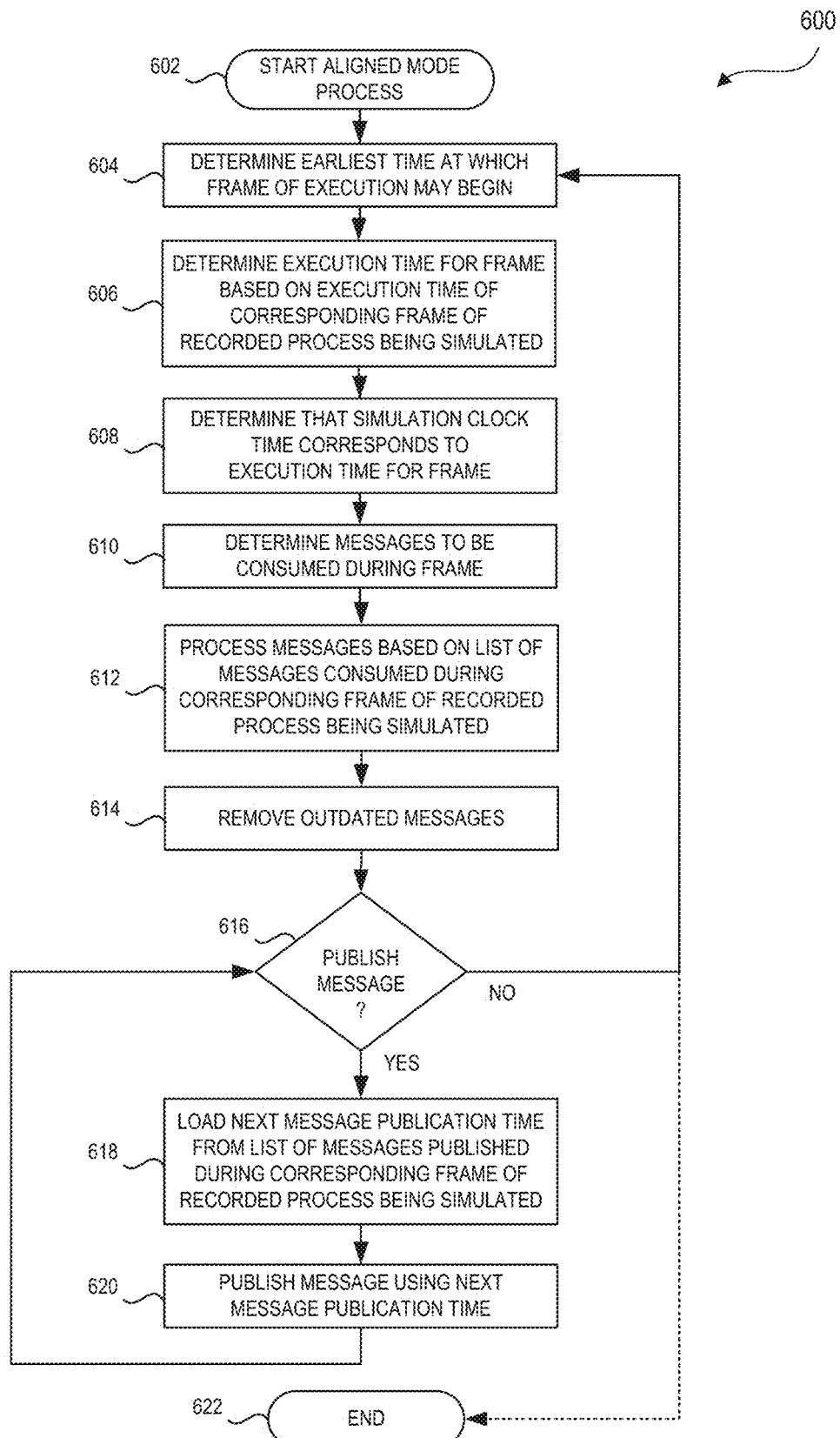
FIG. 6 illustrates a flow diagram of a routine for managing node execution—including message generation and consumption—during simulated processing in aligned mode, according to certain aspects of the present disclosure.

FIG. 6 is a flow diagram of an illustrative process 600 for executing a simulation in aligned mode. The process 600 will be described with additional reference to the distributed processing system 500 shown in FIG. 5, and the timelines shown in FIG. 7. Advantageously, executing in aligned mode allows recreation of a recorded process by aligning the execution time for each frame of the simulation to the execution time of a corresponding frame of the recorded process. In addition, aligned mode can ensure that the messages that were consumed during each frame of the recorded process are also consumed by the corresponding frame of the simulation. Further, aligned mode can ensure that messages generated during the simulation have timestamps that correspond to messages generated during the recorded process, thereby facilitating the consumption of those messages in the proper subsequent frames of the simulation based on the messages consumed in the corresponding frames of the recorded process.

To execute process 600, a set of executable program instructions stored on one or more non-transitory computer-readable media (e.g., hard drive, flash memory, removable media, etc.) may be loaded into memory (e.g., random access memory or "RAM") of a computing device. For example, FIG. 11 shows an example computing system 1100 in which aligned mode instructions 1112 may be loaded into memory 1108 and executed by one or more processors 1102.

The process 600 begins at block 602. The blocks of the process 600 illustrated in FIG. 6 (or a subset thereof) may be performed for each frame that occurs during a simulation in aligned mode. Therefore, a single simulation may involve any number of iterations of the process 600. In some embodiments, instances of the process 600 may be performed in parallel or otherwise asynchronously.

At block 604, the orchestrator 508 or some other component of the distributed processing system 500 can determine an earliest time for a frame of execution of a particular recurring task of the simulation. If a prior frame for the recurring task has already been executed during the simulation, then the orchestrator 508 may add an execution interval associated with the recurring task to the execution time of the prior frame. If no prior frame has been executed for the recurring task during the current simulation (e.g., the simulation has just begin), then the orchestrator may determine the earliest execution time as the time currently reflected by the simulation clock, or by adding the execution interval to the time currently reflected by the simulation clock.

At block 606, the orchestrator 508 or some other component of the distributed processing system 500 can determine the next frame execution time for the recurring task based on timing data regarding a recorded process of the distributed processing system being simulated. The orchestrator 508 can identify a frame execution time, from a list of frame execution times recorded for the recurring task during the recorded process, that satisfies a criterion or otherwise corresponds to the earliest execution time determined above in block 604. If a recorded frame execution time in the list of frame execution times is equal to the earliest execution time determined above, then that recorded execution time may be selected as the next frame execution time for the recurring task. If no recorded frame execution time is equal to the earliest execution time determined above, then the next frame execution time may be the earliest recorded frame execution time that is chronologically after the earliest execution time determined above.

At block 608, the orchestrator 508 or some other component of the distributed processing system 500 can determine that the time of the simulation clock corresponds to the next frame execution time. In some embodiments, the orchestrator 508 may set the simulation clock 510 to the next frame execution time and proceed to block 610. In some embodiments, the orchestrator 508 may increment the simulation clock 510 and determine whether the current time of the simulation clock 510 corresponds to any frame execution times. If not, the simulation clock 510 may be incremented and the determination repeated until the simulation clock 510 matches a frame execution time. At this point in time, the frame begins and will be referred to hereafter as the "current frame."

Figure 7:
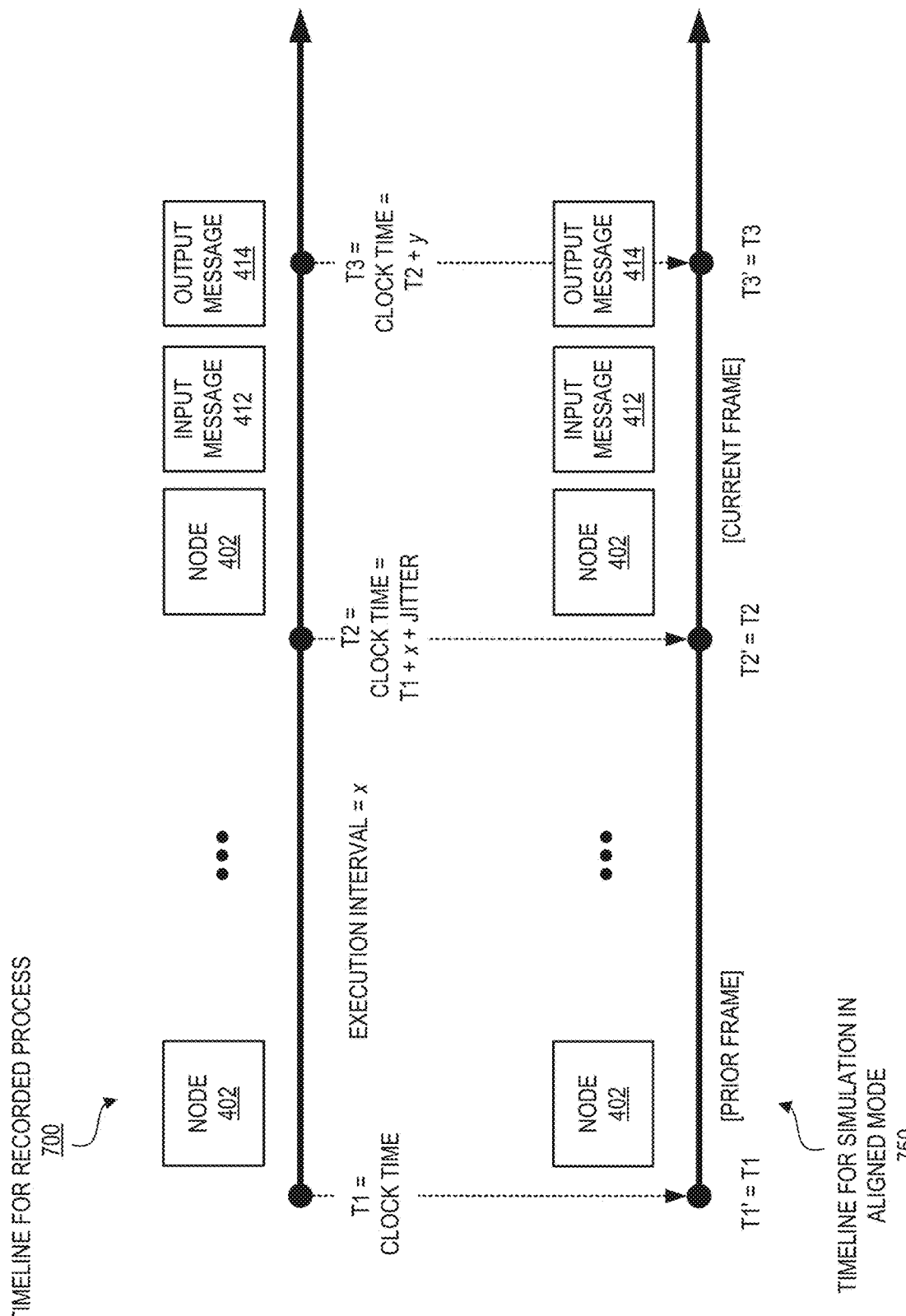
FIG. 7 illustrates a timeline of node execution—including message generation and consumption—during on-board processing and simulated processing in aligned mode, according to certain aspects of the present disclosure.

FIG. 7 illustrates a production timeline 700 for a recorded process being simulated, and a simulation timeline 750 for a simulation of the recorded process in aligned mode. In the illustrated example, a particular recurring task may involve node 402 processing certain sensor data messages using an execution interval of x milliseconds (e.g., 100 milliseconds). The execution time for the prior frame on the production timeline 700 is T1, and the execution time for the prior frame on the simulation timeline is the equivalent time T1'. The earliest time for the current frame of execution in the simulation is therefore T1'+x=T1+x. However, on the production timeline 700, the corresponding frame started after T1+x due to jitter. Because of the jitter, the frame execution time for the corresponding frame on the production timeline is T2, which is equal to T1+x+delay due to jitter. Therefore, rather than setting the frame execution time for the current frame to be T2'=T1'+x, the orchestrator 508 uses the value of T2 from the production process being simulated. If there are no other frames to be executed prior to time T2', the orchestrator 508 may set the simulation clock to time T2' and proceed.

Returning to FIG. 6, at block 610 the orchestrator 508 or some other component of the distributed processing system 500 can determine the messages that are to be consumed during the current frame. The messages that are to be consumed may be organized into one or more topics to which individual nodes of the distributed processing system 500 subscribe. The messages may include sensor data messages from the sensor data store 300 and/or messages generated by various nodes of the computation graph 200 over the course of other recurring tasks during prior frames of execution. In some embodiments, the orchestrator 508 may obtain a listing of all available messages for the current frame, such as all messages that have been published to a particular topic and not yet consumed during the simulation.

At block 612, the orchestrator 508 or some other component of the distributed processing system 500 can process the messages to be consumed during the current frame based on a list of messages consumed during the corresponding frame of the recorded process being simulated. In some embodiments, the orchestrator 508 can obtain a list of messages consumed during the corresponding frame of the recorded process being simulated. For example, the orchestrator 508 may load the data that was included in the "subscribers" section of the frame data structure shown in Table 1. The orchestrator 508 may use this data to ensure that the messages consumed during the corresponding frame of the recorded process are consumed during the current frame of the simulation. In some embodiments, the orchestrator 508 may accomplish this by iterating through the publication times for the messages in the list of messages consumed during the corresponding frame of the recorded process. For each publication time, the orchestrator 508 may obtain a message from the current simulation and provide the message to a node for processing (e.g., via a callback to the node). As described above, the node may perform computational operations based on the message, and the node may generate one or more messages for publication based on the message. The messages of the current simulation may be selected using publication times from the recorded process because, as described above and in greater detail below, the messages are published during the simulation using the same timestamps used to indicate publish time in the recorded process.

At block 614, the orchestrator 508 or some other component of the distributed processing system 500 can optionally remove outdated messages. In some embodiments, messages published more than a threshold time before the time presently reflected by the simulation clock may no longer be relevant. The orchestrator 508 can therefore remove from the message queue(s) messages with publication times more than the threshold time before the current time.

At decision block 616, the orchestrator 508 or some other component of the distributed processing system 500 can determine whether a node is publishing a message during the current frame. Because the message is generated during a simulation and based on simulated sensor data or other simulated messages, it may also be referred to as a "simulated output message" or more simply as a "simulated message." For example, a node of the computation graph 200 may generate a simulated message based on processing a sensor data message from the sensor data store 300 and/or a simulated message generated by another node during a prior frame of the simulation. If there is a simulated message to be published, the process 600 can proceed to block 618. Otherwise, if there are no simulated messages (or no additional simulated messages) to be published during the current frame and all messages to be consumed during the current frame have been consumed, the process 600 may return to block 604 to determine when the next frame is to be executed. If there are no additional frames to be executed during the current simulation, the process 600 may end at bock 622.

At block 618, the orchestrator 508 or some other component of the distributed processing system 500 can load the next message publication time for the current frame from a list of recorded message publication times for the corresponding frame of the recorded process being simulated. For example, the orchestrator 508 may have loaded the data from the "publishers" section of the frame timing record of Table 1. When a message is to be published, the orchestrator 508 may select the next publication time. A default publication time that corresponds to the current time reflected by the simulation clock may be used in some cases, such as when a message may be generated for publication during a frame and there are no corresponding recorded messages from the recorded process being simulated. For example, if a change is made to the computation graph 200 and is being tested using a simulation, an additional message may be generated during the simulation. The orchestrator 508 may use the default publication time for such additional messages.

At block 620, the orchestrator 508 or some other component of the distributed processing system 500 can publish the message using the publication time determined above. By using publication times from the recorded process being simulated instead of using the time on the simulation clock and instead of using a continuously advancing clock, the recorded process can be more accurately simulated. For example, the orchestrator 508 can ensure that the messages to be consumed by other recurring tasks during other frames of execution are timestamped such that they can be identified and consumed during the appropriate frame, as described above.

In the example illustrated in FIG. 7, output message 414 is to be published during the current frame. A corresponding message was published during the same frame of the production process being simulated. Rather than using the time of the simulation clock (which is still set to T2'), the timestamp of the corresponding message from the production process may be used. In this example, the timestamp is T3, which reflects an advancement of y units of time since the beginning of the frame at T2. Therefore, the timestamp of output message 414 in the current frame of the simulation may be set to T3'=T3.

Figure 8:
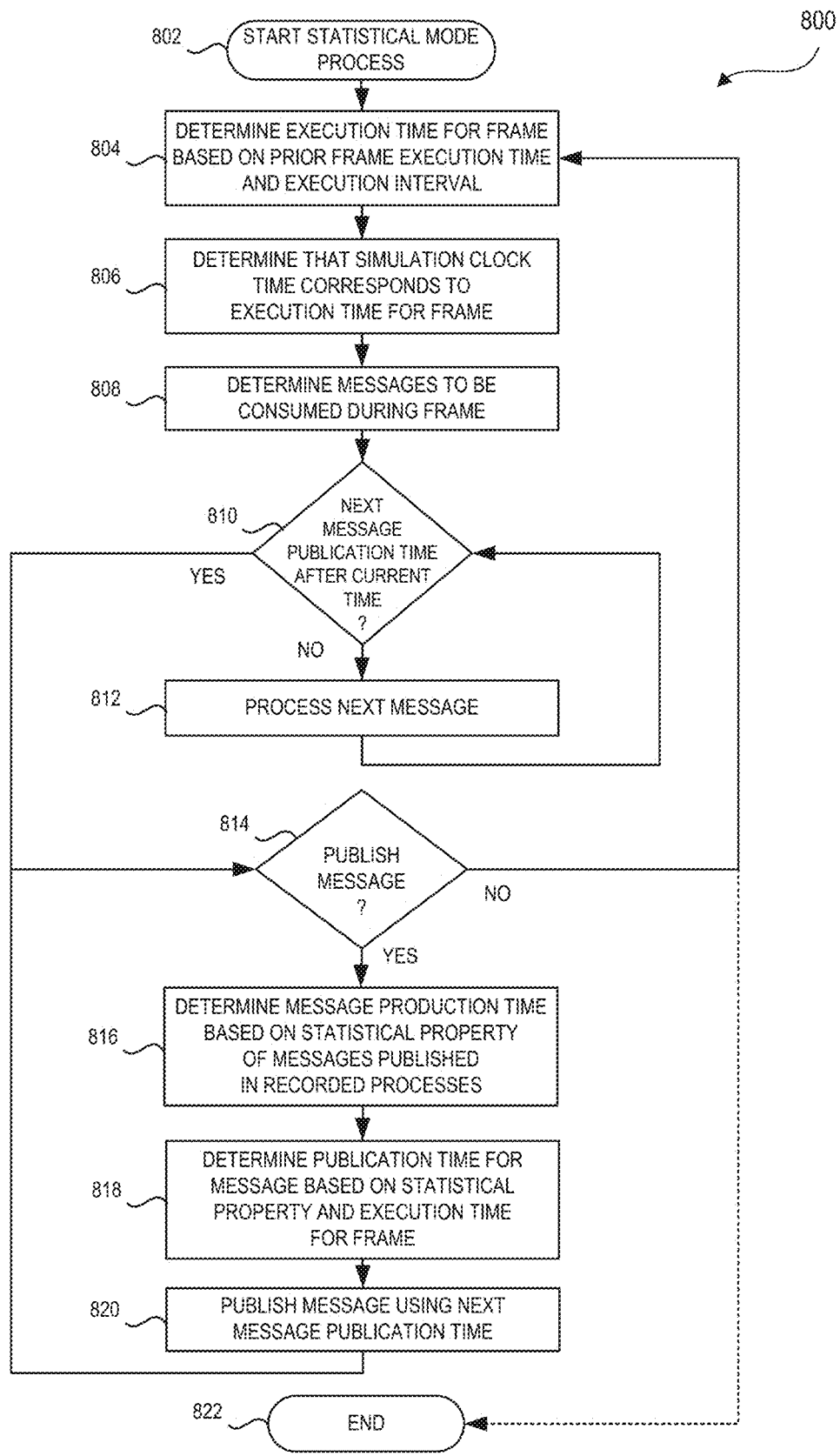
FIG. 8 illustrates a flow diagram of a routine for managing node execution—including message generation and consumption—during simulated processing in statistical mode, according to certain aspects of the present disclosure.

FIG. 8 is a flow diagram of an illustrative process 800 for executing a simulation in statistical mode. The process 800 will be described with additional reference to the distributed processing system 500 shown in FIG. 5, and the timeline 900 shown in FIG. 9. Advantageously, executing in statistical mode allows realistic simulations based on the variance observed in processes conducted using continuously-advancing system clocks, such as real-world scenarios encounter by on-board versions of the computation graph operating in production mode. The timestamps that are used for messages published during frames in statistical mode are assigned based statistical properties of timing data from any number of recorded processes. Thus, even though a simulation clock is used to schedule frames in statistical mode, the messages generated during the frames will nevertheless have realistic timestamps, thereby providing more realistic testing.

To execute process 800, a set of executable program instructions stored on one or more non-transitory computer-readable media (e.g., hard drive, flash memory, removable media, etc.) may be loaded into memory (e.g., random access memory or "RAM") of a computing device. For example, FIG. 11 shows an example computing system 1100 in which statistical mode instructions 1114 may be loaded into memory 1108 and executed by one or more processors 1102.

The process 800 begins at block 802. The blocks of the process 800 illustrated in FIG. 8 (or a subset thereof) may be performed for each frame that occurs during a simulation. Therefore, a single simulation may involve any number of iterations of the process 800. In some embodiments, instances of the process 800 may be performed in parallel or otherwise asynchronously.

At block 804, the orchestrator 508 or some other component of the distributed processing system 500 can determine frame execution for a frame of a particular recurring task. If a prior frame for the recurring task has already been executed during the simulation, then the orchestrator 508 may add an execution interval associated with the recurring task to the execution time of the prior frame, as described above. If no prior frame has been executed for the recurring task during the current simulation (e.g., the simulation has just begin), then the orchestrator may determine the frame execution time as the time currently reflected by the simulation clock, or by adding the execution interval to the time currently reflected by the simulation clock.

At block 806, the orchestrator 508 or some other component of the distributed processing system 500 can determine that the time of the simulation clock corresponds to the next frame execution time determined above at block 804. In some embodiments, the orchestrator 508 may set the simulation clock 510 to the next frame execution time and proceed to block 808. In some embodiments, the orchestrator 508 may increment the simulation clock 510 and determine whether the current time of the simulation clock 510 corresponds to any frame execution times. If not, the simulation clock 510 may be incremented and the determination repeated until the simulation clock 510 matches a frame execution time. At this point in time, the frame begins and will be referred to hereafter as the "current frame."

Figure 9:
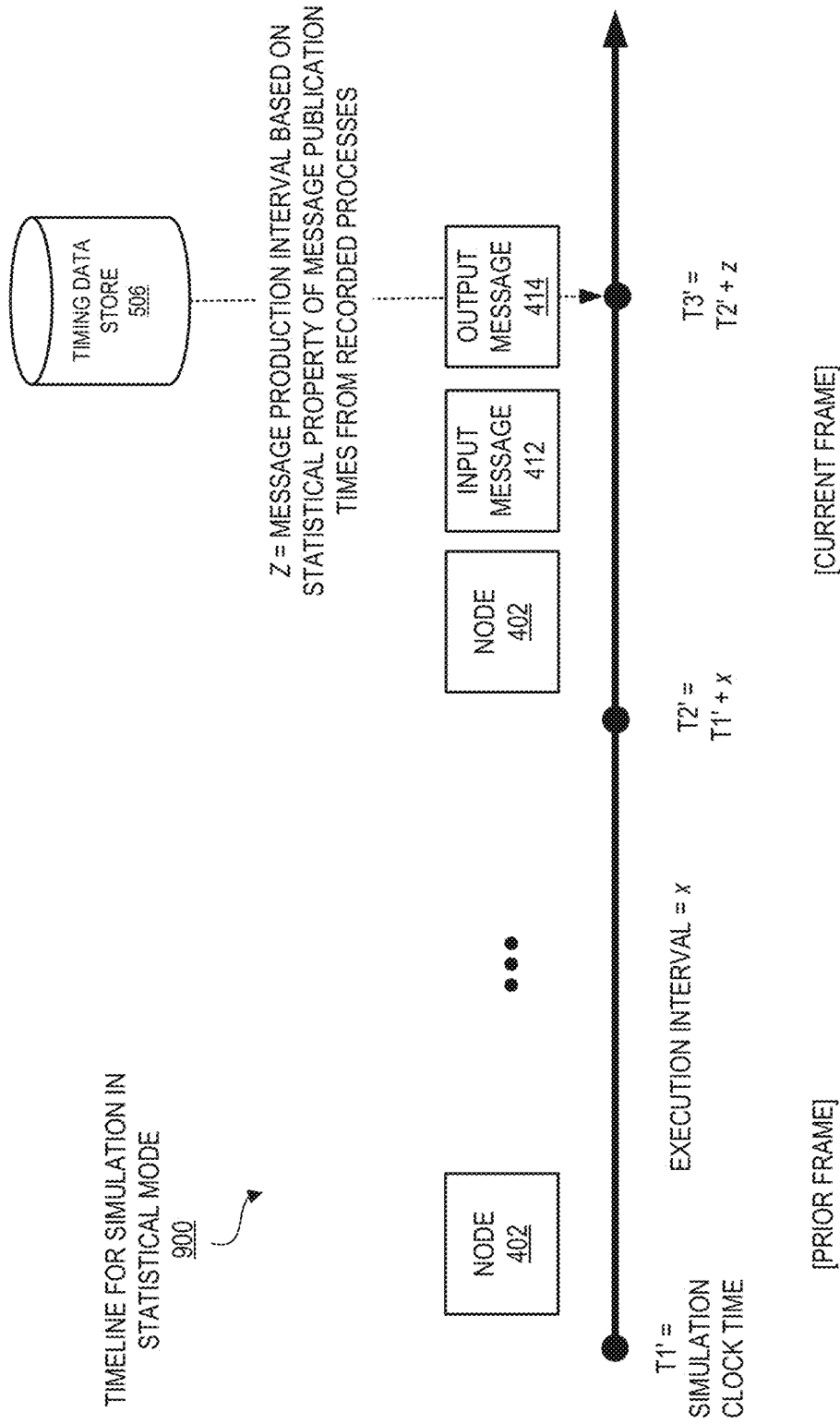
FIG. 9 illustrates a timeline of node execution—including message generation and consumption—during on-board processing and simulated processing in statistical mode, according to certain aspects of the present disclosure.

FIG. 9 illustrates a simulation timeline 900 for a simulation in statistical mode. In the illustrated example, a particular recurring task may involve node 402 processing certain sensor data messages using an execution interval of x milliseconds (e.g., 100 milliseconds). The execution time for the prior frame on the simulation timeline 900 is T1'. The execution time for the current frame of execution in the simulation is therefore T2'=T1'+x. If there are no other frames to be executed prior to time T2', the orchestrator 508 may set the simulation clock to time T2' and proceed.

Returning to FIG. 8, at block 808 the orchestrator 508 or some other component of the distributed processing system 500 can determine the messages that are to be consumed during the current frame. The messages that are to be consumed may organized into one or more topics to which individual nodes of the distributed processing system 500 subscribe. The messages may include sensor data messages from the sensor data store 300 and/or messages generated by various nodes of the computation graph 200 over the course of other recurring tasks during prior frames of execution. In some embodiments, the orchestrator 508 may obtain a listing of all available messages for the current frame, such as all messages that have been published to a particular topic and not yet consumed during the simulation. The messages may be sorted by publication time, with the oldest publication time first.

At decision block 810, the orchestrator 508 can determine whether the first message (or next message if block 810 has been executed at least one previously) has a publication time that is prior to or equal to the current time, as reflected by the simulation clock 510. If so, the process 800 may proceed to block 812. This determination during simulation mode is made because the simulation clock 510 remains static throughout a frame, and only those messages with publication times that are prior to or equal to the time reflected by the simulation clock are to be processed in the current frame. Any message with a publication time that is after the current time is not to be processed in the current frame because it may have publication time that corresponds to a subsequent frame of the current task. Such message publication timestamps may occur depending upon statistical property used to generate the message, as described in greater detail below. If the first (or next) message in the list has a timestamp after the current time, the process 800 may proceed to decision block 814.

At block 812, the most recent message identified at block 810 may be consumed by a component of the distributed processing system 500. In some embodiments, the orchestrator 508 may provide the message to a node of the computation graph 200 for processing (e.g., via a callback to the node). As described above, the node may perform computational operations based on the message, and the node may generate one or more messages for publication based on the message.

At decision block 814, the orchestrator 508 or some other component of the distributed processing system 500 can determine whether a node is publishing a message during the current frame. Because the message is generated during a simulation and based on simulated sensor data or other simulated messages, it may also be referred to as a "simulated output message" or more simply as a "simulated message." For example, a node of the computation graph 200 may generate a simulated message based on processing a sensor data message from the sensor data store 300 and/or a simulated message generate by another node during a prior frame of the simulation. If there is a simulated message to be published, the process 800 can proceed to block 816. Otherwise, if there are no simulated messages (or no additional simulated messages) to be published during the current frame and all messages to be consumed during the current frame have been consumed, the process 800 may return to block 804 to determine when the next frame is to be executed. If there are no additional frames to be executed during the current simulation, the process 800 may end at bock 822.

At block 816, the orchestrator 508 or some other component of the distributed processing system 500 can determine a simulated message production interval for the current message to be published based on a statistical property of message publication times observed in any number of prior processes. The simulated message production interval corresponds to the time interval between the beginning of the current frame and the time at which the message would normally be expected to be produced for publication. The simulated message production interval (also referred to simply as the "message production interval" or alternatively as the "message production period") can be determined based on recorded message publication times for similar messages. For example, timing data for recorded processes may include frame execution timestamps indicating the start time of frames, and message publication timestamps indicating the publication time of messages within the frames. The difference between the publication time of a message and the frame execution time of the frame in which the message was published is the observed message production interval for that message. The orchestrator 508 or some other component of the distributed processing system 500 may determine, prior to or during the simulation, statistical properties of these observed message production intervals.

In some embodiments, the observed message production intervals from recorded processes may be organized into groups based on the recurring task during which the messages were published, publisher identity (e.g., the node that produced the messages), message topic, other properties, or some combination thereof. A statistical property of observed message production intervals for a particular group of messages may be determined for use in the simulation as the message production interval for a message associated with the group. For example, the statistical property may be an average, median, minimum, or maximum of observed message production intervals. When a message production interval for a message associated with the group is to be determined during a simulation, the statistical property may be determined.

In some embodiments, a statistical distribution of observed message production intervals may be generated, such as a normal distribution, uniform distribution, or another statistical distribution. For example, if a normal distribution is used, then a mean and standard deviation of message production intervals for a particular group of messages may be determined. When a message production interval for a message associated with the group is to be determined during a simulation, then a pseudo-random message production interval may be determined from the distribution.

At block 818, the orchestrator 508 or some other component of the distributed processing system 500 can determine a publication time for the message based on the statistical property associated with the current message, determined above, and the frame execution time for the current frame. The publication time may be determined by adding the message production interval to the frame execution time. A default publication time that corresponds to the current time reflected by the simulation clock may be used in some cases, such as when the orchestrator is not able to determine a message publication duration for the current message. For example, if a change is made to the computation graph 200 and causes a new message to be published that is not associated with messages from recorded processes (e.g., a message to a new topic, or a first message from an existing node to an existing topic), the default publication time may be used.

At block 820, the orchestrator 508 or some other component of the distributed processing system 500 can publish the message using the publication time determined above. The process 800 may return to decision block 814 to determine whether additional messages are to be published in the current frame.

In the example illustrated in FIG. 9, output message 414 is to be published during the current frame. A message production interval is determined based on a statistical property of message publication times from recorded processes. Rather than using the time of the simulation clock (which is still set to T2'), the message production interval z is added to the frame execution time T2', reflecting an advancement of z units of time since the beginning of the frame at T2'. Therefore, the timestamp of output message 414 in the current frame of the simulation may be set to T3'=T2'+z.

Figure 10:
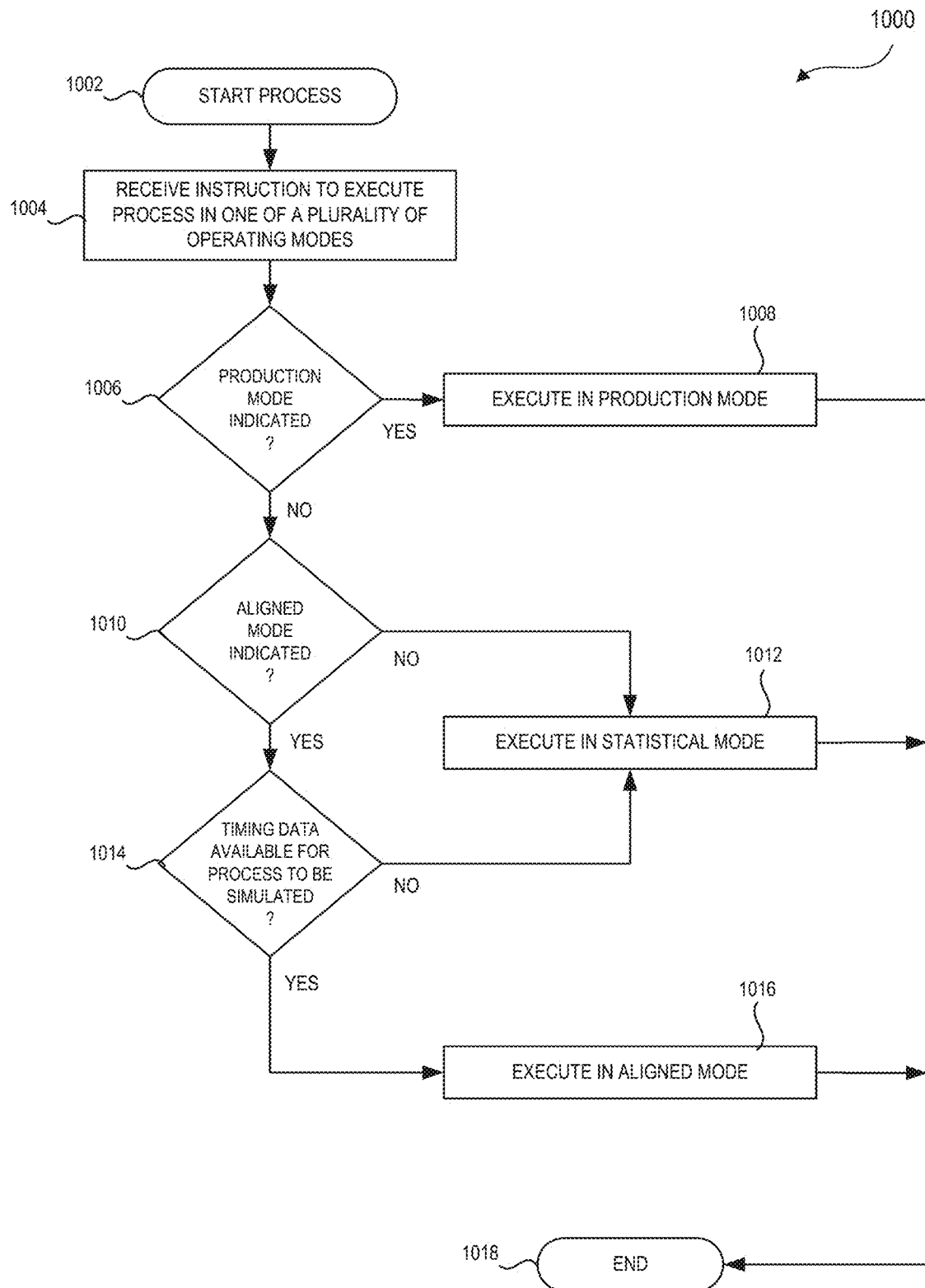
FIG. 10 illustrates a flow diagram of a routine for managing operating mode selection and implementation using a unified application programming interface, according to certain aspects of the present disclosure.

FIG. 10 is a flow diagram of an illustrative process 1000 for using the distributed processing system 500 in one of a plurality of operating modes. Advantageously, the distributed processing system 500 may expose a unified API through which the features of the computation graph 200 and the distributed processing system 500 as a whole may be accessed, additional features may be integrated, and the like. For example, a node may be added to the computation graph 200, and it may include various processing tasks. Because the functions of the distributed processing system 500 are provided via a unified API that shields users of the distributed system 500 from the differences in operating mode implementations, the node does not need to be specially configured for each possible operating mode. Rather, the frame management and message management details that differ among the operating modes are handled automatically. In addition, users of the distributed processing system 500 may request operation in any of the operating modes via the unified API, and the distributed processing system 500 may then proceed to operate in the selected mode without necessarily requiring any additional specific configuration procedures.

The process 1000 begins at block 1002. To execute process 1000, a set of executable program instructions stored on one or more non-transitory computer-readable media (e.g., hard drive, flash memory, removable media, etc.) may be loaded into memory (e.g., random access memory or "RAM") of a computing device. For example, FIG. 11 shows an example computing system 1100 in which operating mode management instructions 1110 may be loaded into memory 1108, and executed by one or more processors 1102.

At block 1004, the orchestrator 508 or some other component of the distributed processing system 500 can receive an instruction to begin execution of the distributed processing system 500. The instruction may include an indication of the operating mode in which the distributed processing system 500 is to be operated. In some embodiments, a parameter or flag associated with the instruction may be set.

At decision block 1006, the orchestrator 508 or some other component of the distributed processing system 500 can determine whether the instruction comprises or is otherwise associated with an indication to operate in production mode. If so, the process 1000 can proceed to block 1008, where the distributed processing system 500 proceeds in production mode. Otherwise, if the instruction does not comprise and is otherwise not associated with an indication to operate in production mode, the process 1000 can proceed to decision block 1010.

At decision block 1010, the orchestrator 508 or some other component of the distributed processing system 500 can determine whether the instruction comprises or is otherwise associated with an indication to operate in aligned mode. If not, the process 1000 can proceed to block 1012. In some embodiments, one of the simulation modes may be designated as a default simulation model. In the illustrated example, statistical mode is used as a default simulation mode. Therefore, at block 1012 the distributed processing system 500 proceeds in statistical mode. Otherwise, if the instruction does comprise or is otherwise associated with an indication to operate in aligned mode, the process 1000 can proceed to decision block 1014.

At decision block 1014, the orchestrator 508 or some other component of the distributed processing system 500 can determine whether timing data is available for a particular process to be simulated. If no timing data is available for the indicated process, or if a particular process to be simulated is not otherwise sufficiently indicated, then the process 1000 may proceed to block 1012 where a default mode may be used. In the illustrated example, the simulation will be executed in statistical mode. Otherwise, if sufficient timing data is available for the process to be simulated such that frame execution times and message publications are able to be aligned with those of the recorded process, the distributed processing system 500 may proceed in aligned mode at block 1016. The process 1000 may terminate at block 1018.

FIG. 11 shows components of an illustrative computing device 1100 configured to implement aspects of the present disclosure. In some embodiments, as shown, the computing device 1100 may include: one or more computer processors 1102, such as physical central processing units ("CPUs");

one or more network interfaces 1104, such as a network interface cards ("NICs"); one or more computer readable medium drives 1106, such as a high density disk ("HDDs"), solid state drives ("SDDs"), flash drives, and/or other persistent non-transitory computer-readable media; and one or more computer readable memories 1108, such as random access memory ("RAM") and/or other volatile non-transitory computer-readable media. The computer readable memory 1108 may include computer program instructions that the computer processor 1102 executes in order to implement one or more embodiments. For example, the computer readable memory 1108 can store operating mode management instructions 1110 for initiating use of the distributed processing system in a selected operating mode. The computer readable memory 1108 may also include aligned mode instructions 1112 for executing a simulation in aligned mode. The computer readable memory 1108 may also include statistical mode instructions 1114 for executing a simulation in statistical mode. The computer readable memory 1108 may also include production mode instructions 1116 for executing in production mode. In some embodiments, the computing device 1100 may also include or be in communication with various other computing devices, data stores, and the like.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

Some example enumerated embodiments are recited in this section in the form of methods, systems, and non-transitory computer-readable media, without limitation.

One aspect of the disclosure provides a system comprising a data store storing trip data regarding a trip of a vehicle. The trip data comprises: simulated sensor data representing sensor data output from a sensor of the vehicle during the trip; execution timing data representing a recorded execution time of a particular execution of a recurrently-executing node during the trip; message timing data representing a first recorded publication time of a first message published by the node during the particular execution; and message consumption data representing a second recorded publication time of a second message consumed by the node during the particular execution. The system further comprises one or more computing devices configured by executable instructions to at least: initiate a simulation of the trip using the simulated sensor data and a simulation clock; determine a simulated execution time within the simulation of the trip at which to execute the node, wherein the simulated execution time is based on the recorded execution time; determine that a time of the simulation clock corresponds to the simulated execution time; execute the node, wherein the time of the simulation clock remains static during execution of the node; and publish a simulated message during execution of the node, wherein the simulated message is based at least partly on the simulated sensor data, and wherein the simulated message is assigned a simulated publication time corresponding to the first recorded publication time.

The system of the preceding paragraph can include any sub-combination of the following features: wherein to determine that the time of the simulation clock corresponds to the simulated execution time, the one or more computing devices are configured by the executable instructions to determine that the time of the simulation clock is equal to or greater than the simulated execution time; identify, based at least partly on the message consumption data, one or more simulated messages corresponding to one or more messages consumed in a single execution of the node during the trip, and consume the one or more simulated messages in a single execution of the node during the simulation of the trip; and identify a second simulated message corresponding to a message consumed during a second execution of the node during the trip, and queue the second simulated message until a second execution of the node during the simulation of the trip.

Another aspect of the disclosure provides a computer-implemented method executed under control of a computing system comprising a computer processor configured to execute specific instructions. The computer-implemented method includes: loading simulation data comprising a simulated sensor message representing sensor data, a first timing data item representing an observed execution time of a subsystem, the observed execution time associated with prior processing of the sensor data, and a second timing data item representing an observed timestamp of an output message of the subsystem, the output message associated with the prior processing of the sensor data; determining that a time of a simulation clock corresponds to the observed execution time represented by the first timing data item; executing the subsystem in response to determining that the time of the simulation clock corresponds to the observed execution time, wherein the simulation clock remains static during execution of the subsystem; and generating a simulated output message of the subsystem based at least partly on the simulated sensor message, wherein a timestamp of the simulated output message comprises the observed timestamp represented by the second timing data item.

The computer-implemented method of the preceding paragraph can include any sub-combination of the following features: initiating a simulation of a recorded process, wherein the simulation data represents data generated during the recorded process, wherein the simulation of the recorded process comprises a plurality of frames of execution, and wherein the time of the simulation clock, corresponding to the observed execution time, represents a start of a particular frame of the plurality of frames of execution; identifying a set of simulated messages that corresponds to a set of messages consumed by the subsystem in a single frame of execution during the recorded process, and consuming, by the subsystem, the set of simulated messages in a single frame of execution during the simulation of the recorded process; determining that a second time of the simulation clock corresponds to a second observed execution time represented by a second timing data item of the simulation data, and executing the subsystem in response to determining that the second time of the simulation clock corresponds to the second observed execution time; determining that a second time of the simulation clock corresponds to a second observed execution time of a second subsystem, wherein the second execution time is represented by a second timing data item of the simulation data, and executing the second subsystem in response to determining that the second time of the simulation clock corresponds to the second observed execution time; generating a second simulated output message of the second subsystem based at least partly on the simulated output message; wherein determining that the time of the simulation clock corresponds to the observed execution time comprises determining that the time of the simulation clock is equal to or greater than the observed execution time; and advancing the simulation clock to a second time in response to completion of execution of the subsystem.

A further aspect of the disclosure provides a system comprising a computer-readable memory storing executable instructions, and one or more processors in communication with the computer readable memory. The one or more processors are programmed by the executable instructions to at least: load simulation data comprising a simulated sensor message representing sensor data, a first timing data item representing an observed execution time of a subsystem, the observed execution time associated with prior processing of the sensor data, and a second timing data item representing an observed timestamp of an output message of the subsystem, the output message associated with the prior processing of the sensor data; determine that a time of a simulation clock corresponds to the observed execution time represented by the first timing data item; execute the subsystem in response to determining that the time of the simulation clock corresponds to the observed execution time, wherein the simulation clock remains static during execution of the subsystem; and generate a simulated output message of the subsystem based at least partly on the simulated sensor message, wherein a timestamp of the simulated output message comprises the observed timestamp represented by the second timing data item.

The system of the preceding paragraph can include any sub-combination of the following features: initiate a simulation of a recorded process, wherein the simulation data represents data generated during the recorded process, wherein the simulation of the recorded process comprises a plurality of frames of execution, and wherein the time of the simulation clock, corresponding to the observed execution time, represents a start of a particular frame of the plurality of frames of execution; identify a set of simulated messages that corresponds to a set of messages consumed by the subsystem in a single frame of execution during the recorded process, and consume the set of simulated messages using the subsystem in a single frame of execution during the simulation of the recorded process; determine that a second time of the simulation clock corresponds to a second observed execution time represented by a second timing data item of the simulation data, and execute the subsystem in response to determining that the second time of the simulation clock corresponds to the second observed execution time; determine that a second time of the simulation clock corresponds to a second observed execution time of a second subsystem, wherein the second execution time is represented by a second timing data item of the simulation data, and execute the second subsystem in response to determining that the second time of the simulation clock corresponds to the second observed execution time; generate a second simulated output message of the second subsystem based at least partly on the simulated output message; determine that the time of the simulation clock is equal to or greater than the observed execution time; and advance the simulation clock to a second time in response to completion of execution of the subsystem.

Yet another aspect of the present disclosure provides a system for simulated processing of sensor data. The system comprises computer-readable memory storing executable instructions, and one or more computing devices configured by the executable instructions to: determine a statistical distribution of message production intervals associated with a node of a computation graph, wherein the node is configured to be executed recurrently to process sensor data, and wherein a message production interval comprises a time interval between initiation of an execution of the node and generation of an output message by the node; initiate a first execution of the node at a first simulated time of a simulation clock, wherein the simulation clock remains static during the first execution of the node; generate a first simulated output message of the node based on processing first simulated sensor data, wherein a timestamp of the first simulated output message is based on a first value of the statistical distribution of message production intervals; initiate a second execution of the node at a second simulated time of the simulation clock, wherein the second simulated time corresponds to a simulated passage of a predetermined time interval between executions of the node, and wherein the simulation clock remains static during the second execution of the node; and generate a second simulated output message based on processing second simulated sensor data, wherein a timestamp of the second simulated output message is based on a second value of the statistical distribution of message production intervals different than the first value.

The system of the preceding paragraph can include any sub-combination of the following features: execute an on-board version of the computation graph during a plurality of trips, and record trip data regarding execution of the on-board version of the computation graph during individual trips of the plurality of trips, wherein trip data regarding a trip of the plurality of trips comprises sensor data representing output of one or more sensors of the vehicle during the trip; message timing data representing a first publication time of a first message published by a node of the on-board version of the computation graph during the trip, and message consumption data representing a second publication time of a second message consumed by the node of the on-board version of the computation graph during the trip; wherein the first simulated sensor data represents sensor data generated by at least one of: a LiDAR sensor, a RADAR sensor, an inertial sensor, or a camera; and wherein to determine the statistical distribution of message production intervals, the one or more computing devices are configured by further executable instructions to determine one of: a normal distribution of message production intervals, or a uniform distribution of message production intervals.

Another aspect of the present disclosure provides a computer-implemented method executed under control of a computing system comprising a computer processor configured to execute specific instructions. The computer-implemented method includes: determining a statistical property of message timestamps of a plurality of prior messages generated by a subsystem, wherein the subsystem is configured to execute recurrently, and wherein individual executions of the subsystem comprise processing message data; determining that a time of a simulation clock corresponds to a simulated passage of a predetermined time interval after a prior execution of the subsystem; initiating a current execution of the subsystem in response to determining that the time corresponds to the simulated passage of the predetermined time interval, wherein the simulation clock remains static during the current execution, and wherein during the current execution, the subsystem processes simulated message data; and generating a simulated output message of the subsystem based at least partly on the simulated message data, wherein a timestamp of the simulated output message is based at least partly on the statistical property of the message timestamps.

The computer-implemented method of the preceding paragraph can include any sub-combination of the following features: obtaining message timing data representing the message timestamps of the plurality of prior messages generated by a subsystem, and determining, for each message of the plurality of prior messages generated by the subsystem, a message production period between a first time at which the subsystem initiated execution and a second time represented by a corresponding message timestamp; wherein determining the statistical property of message timestamps comprises determining one of: an average message production period, a median message production period, a minimum message production period; or a maximum message production period; wherein determining the statistical property comprises determining a statistical distribution of message production periods, and wherein generating the simulated output message comprises determining a pseudo-random value for the timestamp of the simulated output message based at least partly on the statistical distribution of message production periods; setting the simulation clock to a first time corresponding to a first execution of the subsystem, initiating the first execution of the subsystem, wherein the simulation clock remains static during the first execution of the subsystem, and advancing the system clock at least the predetermined time interval after completing the prior execution of the subsystem; wherein generating the simulated output message of the subsystem based at least partly on the simulated message data comprises generating the simulated output message based on at least one of: simulated output of a sensor; or an output message generated by a second subsystem; generating a second simulated output message of the subsystem during a subsequent execution of the subsystem, wherein a second timestamp of the second simulated output message is based at least partly on the statistical property of the message timestamps, and wherein the second timestamp corresponds to a different message production period than the timestamp of the simulated output message; and generating a second simulated output message of a second subsystem during an execution of the second subsystem, wherein a second timestamp of the second simulated output message is based at least partly on a second statistical property of a second set of message timestamps, the second statistical property different than the statistical property.

A further aspect of the present disclosure provides a system comprising a computer-readable memory storing executable instructions, and one or more computer processors programmed by the executable instructions to at least: determine a statistical property of message timestamps of a plurality of prior messages generated by a subsystem, wherein the subsystem is configured to execute recurrently, and wherein individual executions of the subsystem comprise processing message data; determine that a time of a simulation clock corresponds to a simulated passage of a predetermined time interval after a prior execution of the subsystem; initiate a current execution of the subsystem in response to determining that the time corresponds to the simulated passage of the predetermined time interval, wherein the simulation clock remains static during the current execution, and wherein during the current execution, the subsystem processes simulated message data; and generate a simulated output message of the subsystem based at least partly on the simulated message data, wherein a timestamp of the simulated output message is based at least partly on the statistical property of the message timestamps.

The system of the preceding paragraph can include any sub-combination of the following features: obtain message timing data representing the message timestamps of the plurality of prior messages generated by a subsystem, and determine, for each message of the plurality of prior messages generated by the subsystem, a message production period between a first time at which the subsystem initiated execution and a second time represented by a corresponding message timestamp; determine one of: an average message production period, a median message production period, a minimum message production period; or a maximum message production period; determine a statistical distribution of message production periods, and generate a pseudo-random value for the timestamp of the simulated output message based at least partly on the statistical distribution of message production periods; set the simulation clock to a first time corresponding to a first execution of the subsystem, initiate the first execution of the subsystem, wherein the simulation clock remains static during the first execution of the subsystem, and advance the system clock at least the predetermined time interval after completing the prior execution of the subsystem; wherein the message data comprises at least one of: output of a sensor; or an output message generated by a second subsystem; generate a second simulated output message of the subsystem during a subsequent execution of the subsystem, wherein a second timestamp of the second simulated output message is based at least partly on the statistical property of the message timestamps, and wherein the second timestamp corresponds to a different message production period than the timestamp of the simulated output message; and generate a second simulated output message of a second subsystem during an execution of the second subsystem, wherein a second timestamp of the second simulated output message is based at least partly on a second statistical property of a second set of message timestamps, the second statistical property different than the statistical property.

Yet another aspect of the present disclosure provides a system for simulation of distributed processing. The system comprises computer-readable memory, and one or more processors in communication with the computer readable memory and configured to at least load, into the computer-readable memory, a computation graph comprising a plurality of executable nodes, wherein the computation graph is configured to execute in a plurality of operating modes. The plurality of operating modes comprise: a production mode based on a system clock that continuously advances during execution of a node of the plurality of executable nodes, wherein in the production mode, the node is configured to generate a production message based on sensor data received from one or more vehicle-based sensors, and wherein the production message is assigned a production timestamp based on a value of the system clock; an aligned simulation mode based on a simulation clock that remains static during execution of the node, wherein in the aligned simulation mode, the node is configured to generate a first simulated message based on simulated sensor data received from a data store, and wherein the first simulated message is assigned a first simulated timestamp corresponding to the production timestamp; and a statistical simulation mode based on the simulation clock, wherein in the statistical simulation mode, the node is configured to generate a second simulated message based on the simulated sensor data, and wherein the second simulated message is assigned a second simulated timestamp based on a statistical property of a plurality of production timestamps. The one or more processors are further configured to: receive an instruction to execute the computation graph in a selected operating mode of the plurality of operating modes; and execute the computation graph in the selected operating mode.

The system of the preceding paragraph can include any sub-combination of the following features: determine that the selected operating mode comprises the aligned simulation mode, obtain execution timing data representing a recorded execution time of a particular execution of a plurality of executions of the node in production mode, and execute the node at a simulation clock time corresponding to the recorded execution time; obtain the plurality of production timestamps, wherein each production timestamp of the plurality of production timestamps represents a system clock time at which a corresponding production message of a plurality of production messages is generated by the node, and determine the statistical property of the plurality of production timestamps, wherein the statistical property is based on at least one of: an average of the plurality of production timestamps, a median of the plurality of production timestamps; a minimum of the plurality of production timestamps; a maximum of the plurality of production timestamps; or a statistical distribution of the plurality of production timestamps; and wherein the computation graph is associated with an application programming interface ("API"), wherein a function of the API is accessible in each of the plurality of operating modes, and wherein execution of the function in response to being accessed is based on which operating mode of the plurality of operating modes has been selected.

Another aspect of the present disclosure provides a computer-implemented method executed under control of a computing system comprising a computer processor configured with executable instructions. The computer-implemented method includes: receiving a first instruction to execute a first simulation of a distributed process in a first simulation mode of a plurality of simulation modes; executing the first simulation in the first simulation mode, wherein executing the first simulation comprises executing a first set of recurring tasks of the distributed process based on execution initiation timing data regarding a recorded instance of the distributed process, and generating one or more messages based on message generation timing data regarding the recorded instance of the distributed process; receiving a second instruction to execute a second simulation of the distributed process in a second simulation mode of the plurality of simulation modes; and executing the second simulation in the second simulation mode, wherein executing the second simulation comprises executing a second set of the recurring tasks based on predetermined interval data associated with individual recurring tasks of the second set, and generating a message associated a timestamp based on one or more statistical properties of message generation timing data of a plurality of recorded instances of the distributed process.

The computer-implemented method of the preceding paragraph can include any sub-combination of the following features: receiving the first instruction comprises receiving the first instruction via an application programming interface ("API") configured to receive instructions in a single format to execute simulations in each of the plurality of simulation modes, and wherein receiving the second instruction comprises receiving the second instruction via the API; determining, based at least partly on an instruction received via the API, a subset of executable instructions that the computing system is to use to execute a simulation of the distributed process; recording the execution initiation timing data and the message generation timing data during the recorded instance of the distributed process; wherein recording the execution timing data comprises recording a time at which a particular recurring task of the first set of recurring tasks is initiated by a vehicle control system; wherein recording the message generation timing data comprises recording a time at which a particular message is generated by a vehicle control system; recording sensor data provide by one or more vehicle sensors to a vehicle control system during the recorded instance of the distributed process; and determining that the message generation timing data is insufficient to determine a message timestamp, and completing execution of the first simulation in the second simulation mode.

A further aspect of the present disclosure provides a system comprising a computer-readable memory storing executable instructions, and one or more processors programmed by the executable instructions to at least. The one or more processors are configured to at least: receive a first instruction to execute a first simulation of a distributed process in a first simulation mode of a plurality of simulation modes; execute the first simulation in the first simulation mode, wherein to execute the first simulation, the one or more processors are programmed to execute a first set of recurring tasks of the distributed process based on execution initiation timing data regarding a recorded instance of the distributed process, and generate one or more messages based on message generation timing data regarding the recorded instance of the distributed process; receive a second instruction to execute a second simulation of the distributed process in a second simulation mode of the plurality of simulation modes; and execute the second simulation in the second simulation mode, wherein to execute the second simulation, the one or more processors are programmed to execute a second set of the recurring tasks based on predetermined interval data associated with individual recurring tasks of the second set, and generate a message associated a timestamp based on one or more statistical properties of message generation timing data of a plurality of recorded instances of the distributed process.

The system of the preceding paragraph can include any sub-combination of the following features: receive the first instruction via an application programming interface ("API") configured to receive instructions in a single format to execute simulations in each of the plurality of simulation modes, and wherein receiving the second instruction comprises receiving the second instruction via the API; determine, based at least partly on an instruction received via the API, a subset of executable instructions that the computing system is to use to execute a simulation of the distributed process; record the execution initiation timing data and the message generation timing data during the recorded instance of the distributed process; record a time at which a particular recurring task of the first set of recurring tasks is initiated by a vehicle control system; record a time at which a particular message is generated by a vehicle control system; record sensor data provide by one or more vehicle sensors to a vehicle control system during the recorded instance of the distributed process; and determine that the message generation timing data is insufficient to determine a message timestamp, and complete execution of the first simulation in the second simulation mode.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system for simulated processing of sensor data, the system comprising:
   computer-readable memory storing executable instructions; and
   one or more computing devices configured by the executable instructions to:
      determine a statistical distribution of message production intervals associated with a node of a computation graph, wherein the node is configured to be executed recurrently to process sensor data, and wherein a message production interval comprises a time interval between initiation of an execution of the node and generation of an output message by the node;
      initiate a first execution of the node at a first simulated time of a simulation clock, wherein the simulation clock remains static during the first execution of the node;
      generate a first simulated output message of the node based on processing first simulated sensor data, wherein a timestamp of the first simulated output message is based on a first value of the statistical distribution of message production intervals;
      initiate a second execution of the node at a second simulated time of the simulation clock, wherein the second simulated time corresponds to a simulated passage of a predetermined time interval between executions of the node, and wherein the simulation clock remains static during the second execution of the node; and
      generate a second simulated output message based on processing second simulated sensor data, wherein a timestamp of the second simulated output message is based on a second value of the statistical distribution of message production intervals different than the first value.

2. The system of claim 1, further comprising a vehicle configured to:
   execute an on-board version of the computation graph during a plurality of trips; and
   record trip data regarding execution of the on-board version of the computation graph during individual trips of the plurality of trips, wherein trip data regarding a trip of the plurality of trips comprises:
      sensor data representing output of one or more sensors of the vehicle during the trip;
      message timing data representing a first publication time of a first message published by a node of the on-board version of the computation graph during the trip; and
      message consumption data representing a second publication time of a second message consumed by the node of the on-board version of the computation graph during the trip.

3. The system of claim 1, wherein the first simulated sensor data represents sensor data generated by at least one of: a LiDAR sensor, a RADAR sensor, an inertial sensor, or a camera.

4. The system of claim 1, wherein to determine the statistical distribution of message production intervals, the one or more computing devices are configured by further executable instructions to determine one of: a normal distribution of message production intervals, or a uniform distribution of message production intervals.

5. A computer-implemented method comprising:
   under control of a computing system comprising a computer processor configured to execute specific instructions,
      determining a statistical property of message timestamps of a plurality of prior messages generated by a subsystem, wherein the subsystem is configured to execute recurrently, and wherein individual executions of the subsystem comprise processing message data;
      determining that a time of a simulation clock corresponds to a simulated passage of a predetermined time interval after a prior execution of the subsystem;
      initiating a current execution of the subsystem in response to determining that the time corresponds to the simulated passage of the predetermined time interval, wherein the simulation clock remains static during the current execution, and wherein during the current execution, the subsystem processes simulated message data; and
      generating a simulated output message of the subsystem based at least partly on the simulated message data, wherein a timestamp of the simulated output message is based on the statistical property of the message timestamps.

6. The computer-implemented method of claim 5, further comprising:
   obtaining message timing data representing the message timestamps of the plurality of prior messages generated by a subsystem; and
   determining, for each message of the plurality of prior messages generated by the subsystem, a message production period between a first time at which the subsystem initiated execution and a second time represented by a corresponding message timestamp.

7. The computer-implemented method of claim 6, wherein determining the statistical property of message timestamps comprises determining one of: an average message production period, a median message production period, a minimum message production period; or a maximum message production period.

8. The computer-implemented method of claim 6,
   wherein determining the statistical property comprises determining a statistical distribution of message production periods; and
   wherein generating the simulated output message comprises determining a pseudo-random value for the timestamp of the simulated output message based on the statistical distribution of message production periods.

9. The computer-implemented method of claim 5, further comprising:
setting the simulation clock to a first time corresponding to a first execution of the subsystem;
initiating the first execution of the subsystem, wherein the simulation clock remains static during the first execution of the subsystem; and
advancing the simulation clock at least the predetermined time interval after completing the prior execution of the subsystem.

10. The computer-implemented method of claim 5, wherein generating the simulated output message of the subsystem based at least partly on the simulated message data comprises generating the simulated output message based on at least one of: simulated output of a sensor; or an output message generated by a second subsystem.

11. The computer-implemented method of claim 5, further comprising generating a second simulated output message of the subsystem during a subsequent execution of the subsystem, wherein a second timestamp of the second simulated output message is based on the statistical property of the message timestamps, and wherein the second timestamp corresponds to a different message production period than the timestamp of the simulated output message.

12. The computer-implemented method of claim 5, further comprising generating a second simulated output message of a second subsystem during an execution of the second subsystem, wherein a second timestamp of the second simulated output message is based on a second statistical property of a second set of message timestamps, the second statistical property different than the statistical property.

13. A system comprising:
computer-readable memory storing executable instructions; and
one or more processors programmed by the executable instructions to:
determine a statistical property of message timestamps of a plurality of prior messages generated by a subsystem, wherein the subsystem is configured to execute recurrently, and wherein individual executions of the subsystem comprise processing message data;
determine that a time of a simulation clock corresponds to a simulated passage of a predetermined time interval after a prior execution of the subsystem;
initiate a current execution of the subsystem in response to determining that the time corresponds to the simulated passage of the predetermined time interval, wherein the simulation clock remains static during the current execution, and wherein during the current execution, the subsystem processes simulated message data; and
generate a simulated output message of the subsystem based at least partly on the simulated message data, wherein a timestamp of the simulated output message is based on the statistical property of the message timestamps.

14. The system of claim 13, wherein the one or more processors are programmed by further executable instructions to:
obtain message timing data representing the message timestamps of the plurality of prior messages generated by a subsystem; and
determine, for each message of the plurality of prior messages generated by the subsystem, a message production period between a first time at which the subsystem initiated execution and a second time represented by a corresponding message timestamp.

15. The system of claim 14, wherein to determine the statistical property of message timestamps, the one or more processors are programmed by further executable instructions to determine one of: an average message production period, a median message production period, a minimum message production period; or a maximum message production period.

16. The system of claim 14,
wherein to determine the statistical property, the one or more processors are programmed by further executable instructions to determine a statistical distribution of message production periods; and
wherein to generate the simulated output message, the one or more processors are programmed by further executable instructions to generate a pseudo-random value for the timestamp of the simulated output message based on the statistical distribution of message production periods.

17. The system of claim 13, wherein the one or more processors are programmed by further executable instructions to:
set the simulation clock to a first time corresponding to a first execution of the subsystem;
initiate the first execution of the subsystem, wherein the simulation clock remains static during the first execution of the subsystem; and
advance the simulation clock at least the predetermined time interval after completing the prior execution of the subsystem.

18. The system of claim 13, wherein the message data comprises at least one of: output of a sensor; or an output message generated by a second subsystem.

19. The system of claim 13, wherein the one or more processors are programmed by further executable instructions to generate a second simulated output message of the subsystem during a subsequent execution of the subsystem, wherein a second timestamp of the second simulated output message is based on the statistical property of the message timestamps, and wherein the second timestamp corresponds to a different message production period than the timestamp of the simulated output message.

20. The system of claim 13, wherein the one or more processors are programmed by further executable instructions to generate a second simulated output message of a second subsystem during an execution of the second subsystem, wherein a second timestamp of the second simulated output message is based on a second statistical property of a second set of message timestamps, the second statistical property different than the statistical property.

* * * * *